United States Patent [19]

Wheadon et al.

[11] Patent Number: 5,079,111
[45] Date of Patent: Jan. 7, 1992

[54] METHOD FOR THE MANUFACTURE OF LEAD-ACID BATTERIES AND AN ASSOCIATED APPARATUS AND ASSOCIATED LEAD-ACID BATTERY

[75] Inventors: Ellis G. Wheadon, Bernville; Larry L. Forrer, Reading, both of Pa.

[73] Assignee: Caltec International, Inc., Temple, Pa.

[21] Appl. No.: 535,108

[22] Filed: Jun. 8, 1990

Related U.S. Application Data

[62] Division of Ser. No. 315,722, Feb. 24, 1989, Pat. No. 4,982,482.

[51] Int. Cl.$^5$ .............................................. H01M 4/14
[52] U.S. Cl. ...................................... 429/241; 429/242; 429/225
[58] Field of Search .......................... 429/241, 242, 225

[56] References Cited

U.S. PATENT DOCUMENTS

| | | |
|---|---|---|
| 1,214,210 | 1/1917 | Mills . |
| 1,403,394 | 1/1922 | Drambourg ......................... 429/241 |
| 1,587,326 | 6/1926 | Johnson et al. . |
| 1,982,485 | 11/1934 | Salmon et al. ...................... 429/242 |
| 2,503,970 | 4/1950 | Rupp . |
| 3,556,854 | 1/1971 | Wheadon et al. . |
| 3,758,340 | 9/1973 | Adams . |
| 3,853,626 | 12/1974 | Daniels, Jr. et al. . |
| 3,894,886 | 7/1975 | Pankow et al. . |
| 3,951,688 | 4/1976 | Pankow et al. . |
| 4,196,757 | 4/1980 | Hug et al. . |
| 4,247,970 | 2/1981 | Bollinger . |
| 4,271,586 | 6/1981 | McCartney, Jr. . |
| 4,318,430 | 3/1982 | Perman . |
| 4,342,342 | 8/1982 | Wheadon . |
| 4,349,067 | 9/1982 | Wirtz et al. . |
| 4,351,891 | 9/1982 | McCartney, Jr. et al. . |
| 4,417,608 | 11/1983 | McCartney, Jr. et al. . |
| 4,499,929 | 2/1985 | Shima et al. . |

FOREIGN PATENT DOCUMENTS

| | | |
|---|---|---|
| 1407547 | 6/1965 | France . |
| 2254886 | 7/1975 | France . |
| 2466870 | 4/1981 | France . |
| 0015361 | 1/1982 | Japan ................................. 429/225 |
| 0209066 | 12/1983 | Japan ................................. 429/242 |
| 0037655 | 3/1984 | Japan ................................. 429/225 |
| 59-56367 | 3/1984 | Japan . |
| 0257954 | 9/1984 | Japan ................................. 429/225 |
| 455308 | 10/1936 | United Kingdom . |
| 618716 | 2/1949 | United Kingdom . |

Primary Examiner—Stephen J. Kalafut
Attorney, Agent, or Firm—Arnold B. Silverman; David V. Radack

[57] ABSTRACT

A method for the manufacture of lead-acid batteries and associated apparatus and a lead-acid battery design resulting therefrom is disclosed. The method involves providing a battery grid and pasting the grid with a battery paste such that a profiled and tapered battery plate is formed. This battery plate is wrapped onto a coil and cured in curing apparatus. A battery element is formed using coils of the finished plate stock, separator material, and winged end plate. After this, several battery elements are then placed into a battery container.

13 Claims, 13 Drawing Sheets

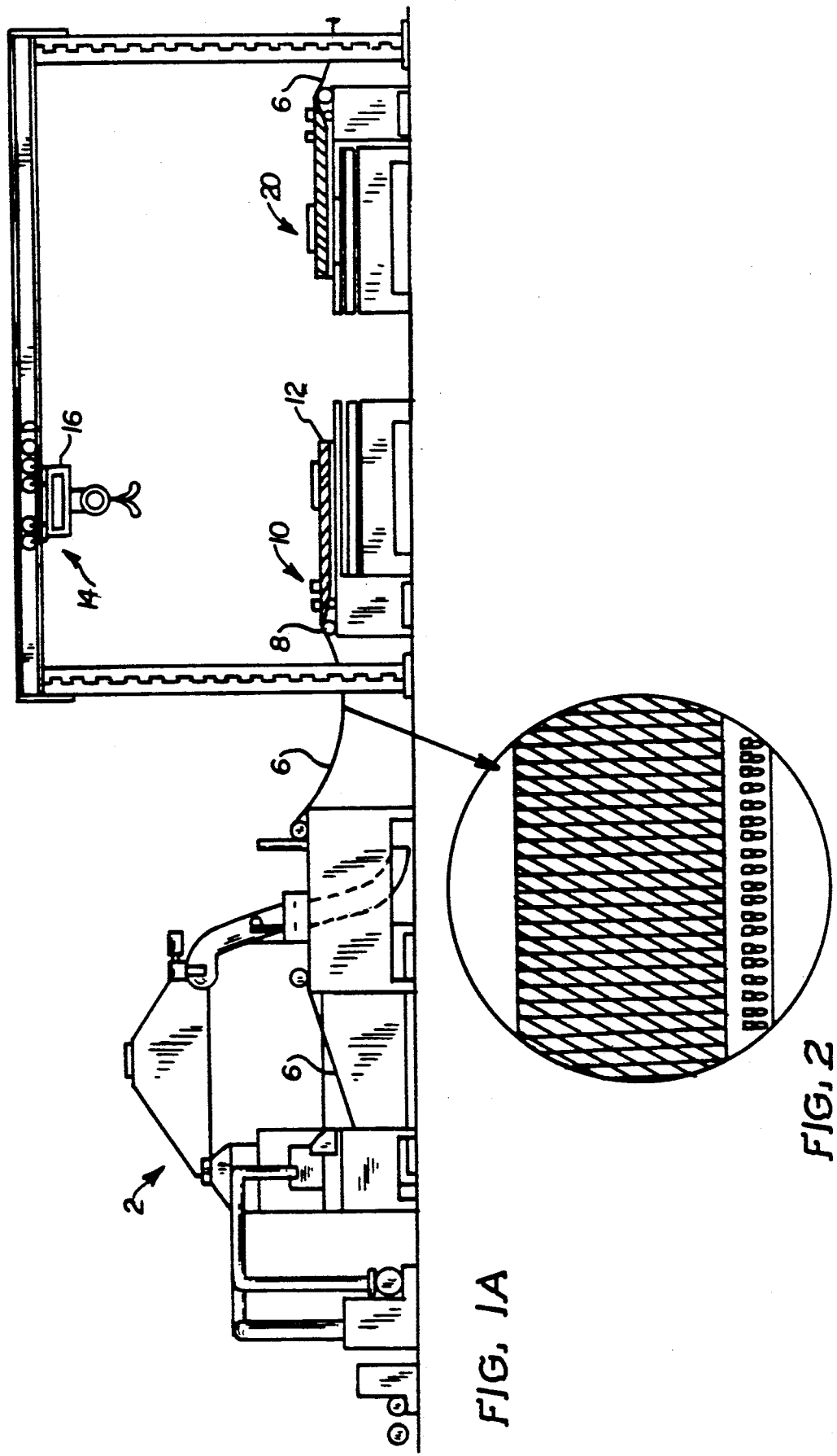

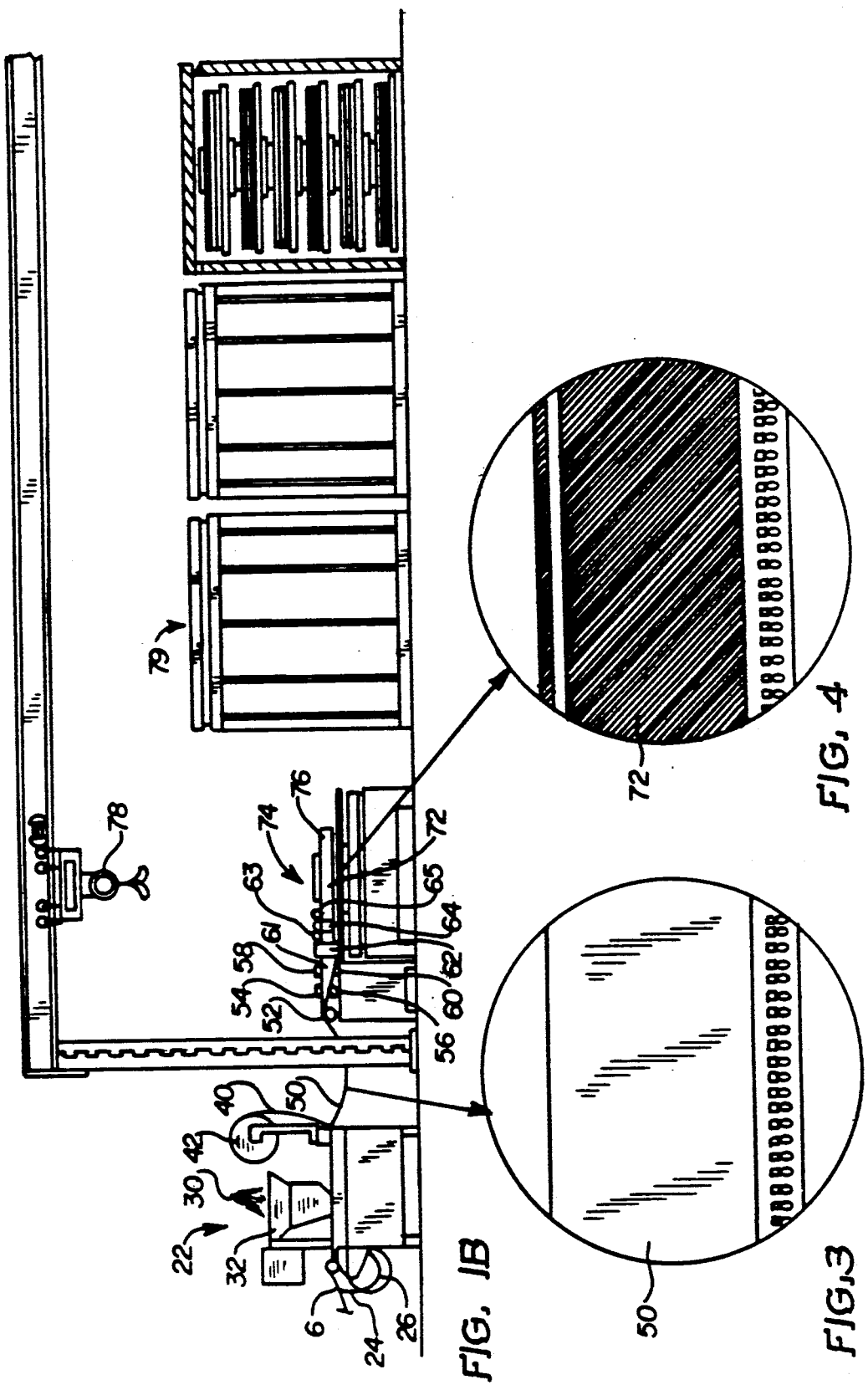

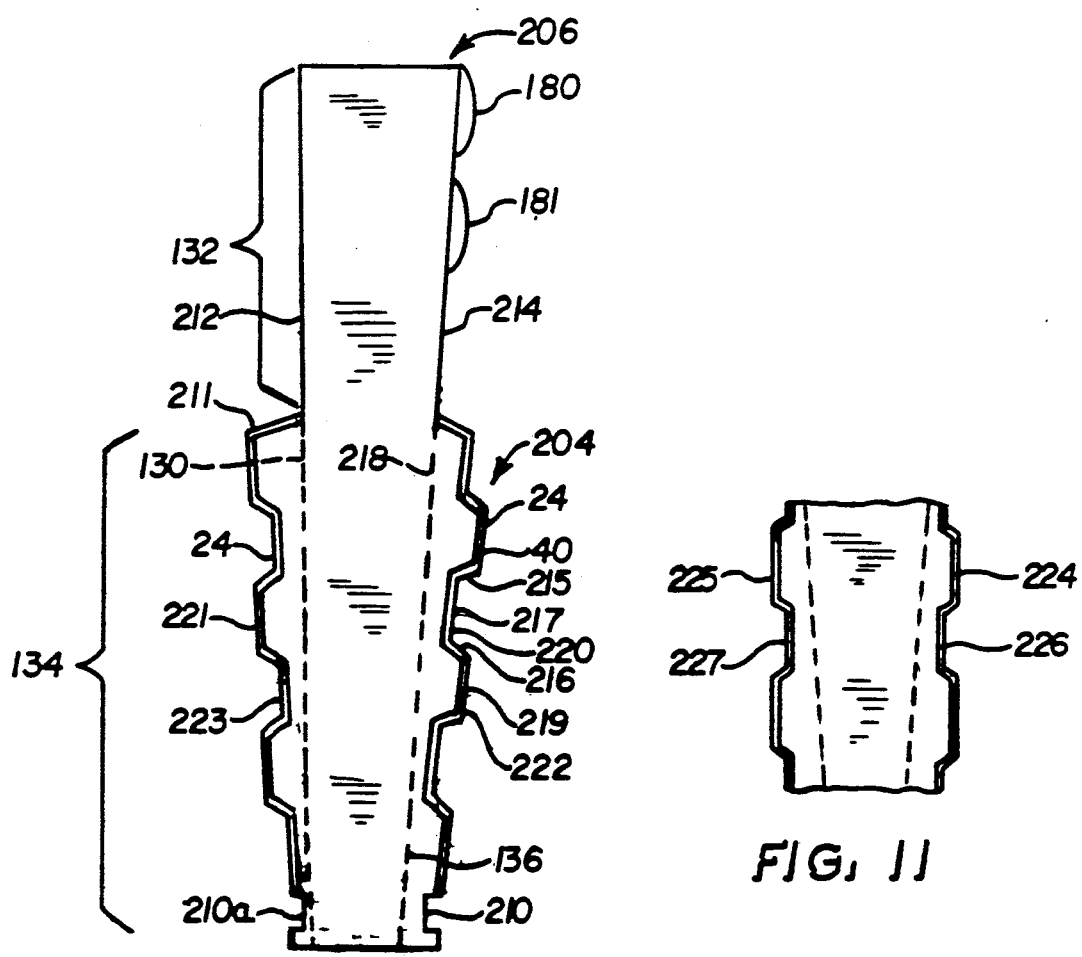
FIG. 10
FIG. 11
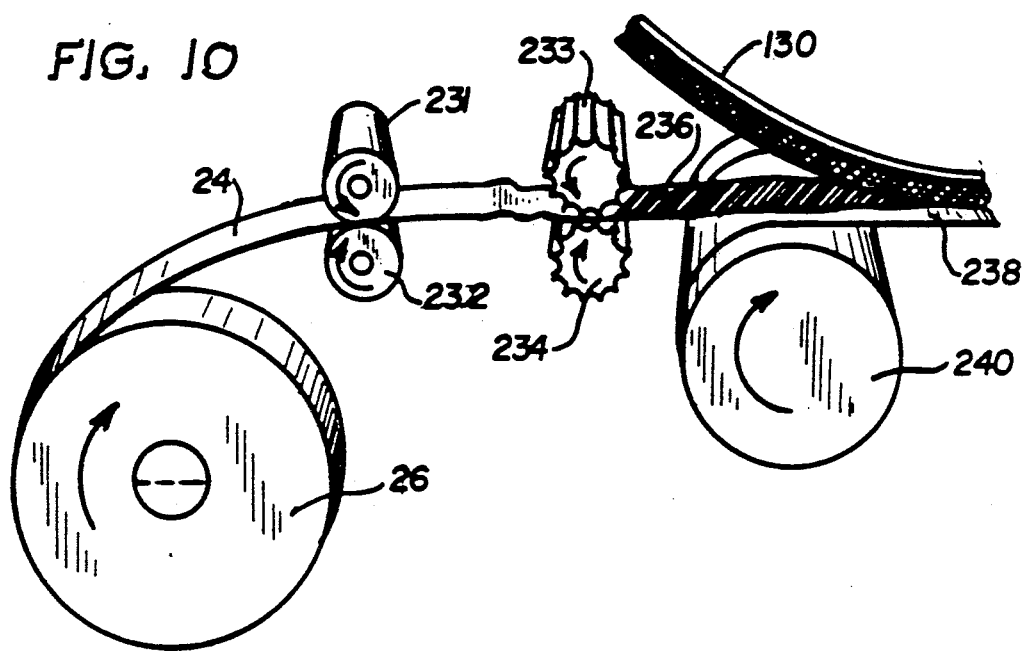
FIG. 12

METHOD FOR THE MANUFACTURE OF LEAD-ACID BATTERIES AND AN ASSOCIATED APPARATUS AND ASSOCIATED LEAD-ACID BATTERY

This is a division of application Ser. No. 07/315,722, filed Feb. 24, 1989, now U.S. Pat. No. 4,982,482.

BACKGROUND OF THE INVENTION

1. Field Of The Invention

This invention relates to an automated process for the manufacture of lead-acid batteries and an associated apparatus and new features of battery design and construction resulting therefrom. More specifically, this invention pertains to an improved lead-acid battery and an efficient method and associated apparatus for its manufacture in a large variety of shapes and sizes for uses such as automotive starting, traction, industrial, and small sealed lead-acid battery applications.

2. Description Of The Prior Art

Lead acid batteries are a well known source of energy. The conventional lead-acid battery consists of a plurality of positive plates and a plurality of negative plates separated by porous separators. The plates are made by pasting a leady oxide material over the lead wire grid. Separate positive and negative plates are pasted and cured, with each of the plates having a lug disposed on the top portion of the plate. Prior to being placed in the battery container, a separator is placed between each plate and the negative and positive plate lugs are joined by two separate plate straps, one for the positive plate lugs and one for the negative plate lugs. Once placed into the container the intercell connections are made and the battery container and cover are sealed together. The positive and negative posts are welded in the cover, the acid is added, and the battery is formed electrochemically.

As is well known, the chemical reaction between the battery plates and the acid produces an electric charge which can be used to start an automobile, for example. The chemical reaction is reversible so that a generator in an automobile, for example, can recharge the battery.

There are many known processes for making lead-acid batteries. One known process is disclosed in U.S. Pat. No. 4,271,586. This process involves feeding a ribbon of lead into an inline expander (such as is described in U.S. Pat. No. 3,853,626) to produce a continuous bilateral length of grid making stock. The stock has a central unexpanded strip and two unexpanded strips at the lateral edges thereof. Between the central unexpanded strip and each lateral edge, there is a network of grid wires formed by the expander. The grid-making stock enters a belt paster for filling the grid network with battery paste. The pasting machine sandwiches the grid making stock and paste between paper strips fed from paper rolls. Plate forming stock exits the paster and passes into an oven for flash drying. Following flash drying and cutting, the plate forming stock is ready for curing. After curing, a stacker accumulates the plates for subsequent processing into a lead-acid battery.

The subsequent processing involves making a battery element out of the negative and positive battery plates and the separators. After this, the positive lugs of the battery elements and the negative lugs of the battery elements are separately joined by exposing each of them to molten lead, which subsequently hardens to form the plate strap. The elements are then placed into the container, the intercell connection made, and the battery container and cover are sealingly joined. Finally, the posts are formed on the battery cover.

It will be appreciated that the battery manufacturing process broadly involves five related aspects. The first aspect is the manufacturing of the battery grid. The second aspect is the pasting of the grid. Curing of the battery plates is the third aspect. The fourth aspect involves cutting and stacking of the battery plates and the separator to form a battery element. The fifth aspect is the containerization of one or a plurality of the battery elements to form the final battery product.

Existing manufacturing processes and the battery designs that result therefrom have several disadvantages. Each of the five aspects mentioned hereinbefore will be discussed with reference to the disadvantages related to not only the known processes involved with the five aspects but also the inadequacies of the product produced by the known processes.

Starting with the first aspect, the battery grid, it is known to mold cast or continuously cast the grids having pre-positioned lugs. It has also been known that grids may be formed by expanding a lead strip to form the reticulated grid wire portion and the grid border portions. See U.S. Pat. Nos. 3,853,626; 4,247,970; and 4,271,586.

In these processes, the grid border and the grid wires have a uniform thickness. The use of permanent molds in the casting of the grid and the pre-positioning of the lug in continuous casting limit the use of a particular grid pattern to a single battery. This results in the need for a large number of molds and associated tooling to produce the wide variety of batteries required in the marketplace. Further, as the grid requires greater electrical conductivity towards the top border containing the lug, the use of a uniform cross-section equivalent to the maximum section needed to conduct the electricity generated in the plate results in an inefficient use of lead and needlessly increases the weight and cost of the battery. Another problem encountered in the use of conventional grids of uniform cross-section is the tendency for plates to separate from cast-on plate straps in the containerization process if a metallurgical bond is not achieved during the cast-on operation.

In the second aspect, the battery plates are normally produced by passing cast grids through an orifice-type or belt-type paster. See, e.g., U.S. Pat. Nos. 3,758,340; 3,894,886; 3,951,688; and 4,318,430. Plates may be "flush pasted" (i.e., the thickness of the paste layer is approximately equal to thickness of the grid) or "overpasted" on one side (i.e., the paste layer is flush with one surface of the grid but extends beyond the surface of the grid on the opposite side). In either case, the surfaces of the paste on opposite sides of the plate are normally smooth and parallel.

Several problems are associated with the hereinbefore described method and battery plate produced. First, "flush pasting" usually leaves lead grid wires exposed to acid during operation of the battery, thereby increasing the chance of grid corrosion which, in turn, shortens battery life. Second, plates must normally be flat to permit proper stacking during transport and curing. Third, both belt pasters and orifice pasters have difficulty in "overpasting" the grid on both sides. That is, "overpasting" the underside of the grid is extremely difficult so that "overpasted" plates are usually produced with only the upper side of the plate in the "overpasted" condition, especially if belt pasters are used.

In addition, many of the problems with conventional batteries can be traced to existing pasting technology, including: (a) stratification of acid due to the lack of circulation caused, in part, by having the flat surface of the battery plate in contact with the flat surface on one side of the separator; (b) gas bubbles entrapped between the battery plate and the flat side of the separator which decreases overall efficiency; (c) the use of costly ribbed separators (to partially alleviate acid stratification and gas bubble entrapment); (d) inefficient active material utilization resulting from the use of non-tapered plates with smooth surfaces, (i.e., utilization at the top of the plate is greater than that at the bottom); and (e) increased internal resistance resulting from the gap between the separator and the battery plate when ribbed separators are used.

The third aspect involves plate curing. Lead-acid battery plates are cured after pasting in order to oxidize any free lead in the plate, obtain the desired crystal structure of lead sulfate in the plate, convert the paste to a strong crack-free mass that can be easily handled, and improve adhesion to the grid. See U.S. Pat. Nos. 1,806,108; 4,342,342; and 4,499,929.

Curing is usually accomplished by (a) treating stacks of pasted plates prepared from cast grid "doubles" in curing chambers under conditions of controlled temperature and humidity or (b) "aging" stacks of plates under ambient conditions using moist burlap covers to help retard the rate of drying caused by the exothermic reaction which takes place. In the former instance total cure time is quite long, ranging from three to five days, and humidity is controlled by the injection of steam into the chamber. "Aging" requires even longer times and does not yield consistent curing conditions from batch to batch.

In spite of attempts to control and accelerate the process by using controlled curing chambers, plate quality normally varies because curing chambers are usually emptied and filled once per shift (i.e., once per eight hour period). Thus plates prepared earilier in the shift begin to cure at room temperature and can cure for as much as seven hours longer than plates prepared later in the shift. Also, the stacking of plates causes inconsistencies, as plates in the middle of the stack are subjected to different conditions of temperature and humidity than are those at either end.

In battery element manufacture, the fourth aspect, the combining of cured positive and negative plates and insulating separators into cell elements is normally accomplished by preparing a stack of alternating positive and negative plates having porous, insulating separator material located between each individual plate. See U.S. Pat. No. 4,539,273 and Japanese Patent No. 55-130076. The ampere-hour capacity and performance at high discharge rates of the cell element is normally controlled by the number, size, and thickness of the plates in the battery element. Because of the proliferation of battery sizes required in today's markets, a very large number of cell elements which differ in size, thickness, and number of plates, are required to manufacture the multitude of batteries of varying reserve capacity and cold cranking capability required to be manufactured in each battery plant. This, in turn, requires that the manufacturer produce and inventory plates of many different sizes along with a multitude of battery boxes capable of holding elements made up of various numbers of plates. These factors all greatly increase the cost of manufacture.

The cost of manufacture of cell elements and batteries produced therefrom is further increased by the relatively inefficient way in which cell elements are currently assembled and placed into the battery container. The most common method involves individually enveloping each positive plate (or in one instance, each negative plate) by folding a flexible porous separator material around the bottom of the plate and sealing, as by welding or mechanical locking for example, the vertical edges of the separator which overlap the edges of the plate. See U.S. Pat. No. 4,657,799. After this, the enveloped plates are stacked in alternating fashion with plates of opposite polarity until the desired number of positive and negative plates has been achieved. The plates are then aligned by vibrating the stack. After alignment the stack is inverted so that the plate lugs are "down", the stack is then lowered into molds containing molten lead which solidifies to form straps connecting all of the positive plates and all of the negative plates, respectively, thereby forming a finished element. Finally, the elements are placed into a battery box containing individual compartments which have been sized to take a particular element.

In battery manufacturing plants which handle most of the above operations mechanically, a large amount of manual labor is still required. In less sophisticated plants, the process is slow and very labor intensive, and control of product quality is difficult to achieve.

The fifth and final aspect involves containerization. It is known to use the battery container as a means of aligning and holding the cell elements as they move through the cast-on strap operation during which all positive plates in each cell and all negative plates in each cell, respectively, are joined together. See U.S. Pat. Nos. 3,753,783; 3,791,874; 3,915,751; 4,144,927; and 4,509,253. Similar problems as discussed hereinabove with respect to labor costs, manufacturing inefficiencies and raw material waste are also present in known conventional containerization processes.

As will be appreciated from the above, there remains a need for a better performing, lightweight and higher quality lead-acid battery. In addition, there also remains a need for a more efficient, economical, and automated method and associated apparatus for producing not only this improved battery but also other types of lead-acid batteries.

SUMMARY OF THE INVENTION

The method for manufacture of lead-acid batteries and associated apparatus and a lead-acid battery design resulting therefrom have met the above-described need. The invention involves improvements to all five aspects of the manufacturing process discussed hereinabove and also involves an associated apparatus as well as an improved lead-acid battery resulting therefrom due to improvements in the battery grid, battery plate, battery element, and battery container.

The invention, broadly, involves producing a battery grid strip having improved properties, pasting the grid strip to form plate stock which is "overpasted" on both sides and which has a profiled surface area, and curing the plate stock in coil form. The invention then involves automated cutting and stacking of separator material and plate stock to form a battery element having the desired number of plates and separators and then inserting the unique battery element into the battery container.

The battery design resulting from the manufacturing process may have positive and negative grids which are tapered to be thicker at the top and which have protrusions and/or indentations in the lug. In addition, the battery plates of the invention are preferably tapered to the same degree as the grids and, in the preferred embodiment, are profiled to provide the same degree of overpasting on both sides. This increases the surface area of the battery plate, and provides a pre-defined path for acid and gas flow. The invention further provides flat separators between individual positive and negative plates or groups of two or more positive plates and two or more negative plates, and a battery cell element. The number of positive plates between separators and the number of negative plates between separators can be varied to provide desired "customization" of the lead-acid battery.

The invention further provides a curing method and apparatus that effectively cures the plate stock for subsequent further processing.

The invention further provides a "unitized" element construction based upon folding and joining the separators in the battery element which electrically insulates the positive plate from the negative plates within the battery element. Two rigid end plate means with flexible wings are also provided.

The improved battery manufacturing process provides greater uniformity of product and improved quality, greatly improved hygiene and ecology in the manufacturing plant, and utilization of a single manufacturing process for the production of automotive starter batteries, vehicle traction batteries, industrial batteries, and small sealed lead-acid batteries.

It is an object of this invention to provide a manufacturing process for lead-acid batteries that is efficient, economical, and highly automated.

It is a further object of this invention to provide a lead-acid battery having enhanced operating characteristics.

It is a further object of this invention to provide a lead-acid battery manufacturing process which utilizes raw materials more effectively.

It is a further object of this invention to provide an associated apparatus for use in the method of manufacturing the improved lead-acid battery.

It is a further object of this invention to provide a lead-acid battery manufacturing process that requires less on-hand in-process inventories of raw materials.

It is a further object of this invention to provide a lead-acid battery manufacturing process that is highly automated so as to reduce labor costs.

It is a further object of this invention to provide a lead-acid battery manufacturing process which improves hygiene and ecology in the manufacturing plant.

It is a further object of this invention to provide a single lead-acid battery manufacturing process for the production of various different types, sizes, and voltages of lead-acid batteries.

It is a further object of this invention to provide a lead-acid battery having battery plates with a pre-defined profiled path for battery acid and gas flow so as to increase its operating characteristics.

It is a further object of this invention to provide a lead-acid battery having a battery grid with a top lug strip having protrusions or indentations.

It is a further object of this invention to provide a lead-acid battery having flat separators between positive and negative plates.

It is a further object of this invention to provide a curing process and apparatus for more efficiently and effectively curing coils of pasted battery plate stock.

It is a further object of this invention to provide a method and related product that creates a single battery element consisting of multiple battery plates and separators.

It is a further object of this invention to provide a pair of winged end plates on each battery element so as to facilitate containerization of the battery element.

These and other objects of the invention will be fully understood from the following description of the invention with reference to the drawings appended to this application.

BRIEF DESCRIPTION OF THE DRAWINGS

FIG. 1A is a side elevational view of part of the apparatus employed in the manufacturing process of the invention.

FIG. 1B is a continuation of FIG. 1A and shows a side elevation view of another part of the apparatus employed in the manufacturing process of the invention.

FIG. 2 is a top plan view of a portion of the battery grid strip emerging from the casting line.

FIG. 3 is a top plan view of a portion of the pasted battery strip emerging from the paster before it is profiled.

FIG. 4 is an elevational view of a portion of the pasted and profiled battery strip after emerging from the profiling rolls and before being taken up on a coil.

FIG. 10 is an expanded, side elevational view of the portion of the pasted and profiled battery plate strip of FIG. 9.

FIG. 11 is a partial side elevational view of another profile configuration for the pasted battery plate.

FIG. 12 is a perspective view of the bottom layer of paper being applied to the grid strip before the grid strip is pasted.

DESCRIPTION OF THE PREFERRED EMBODIMENTS

Figure 5:
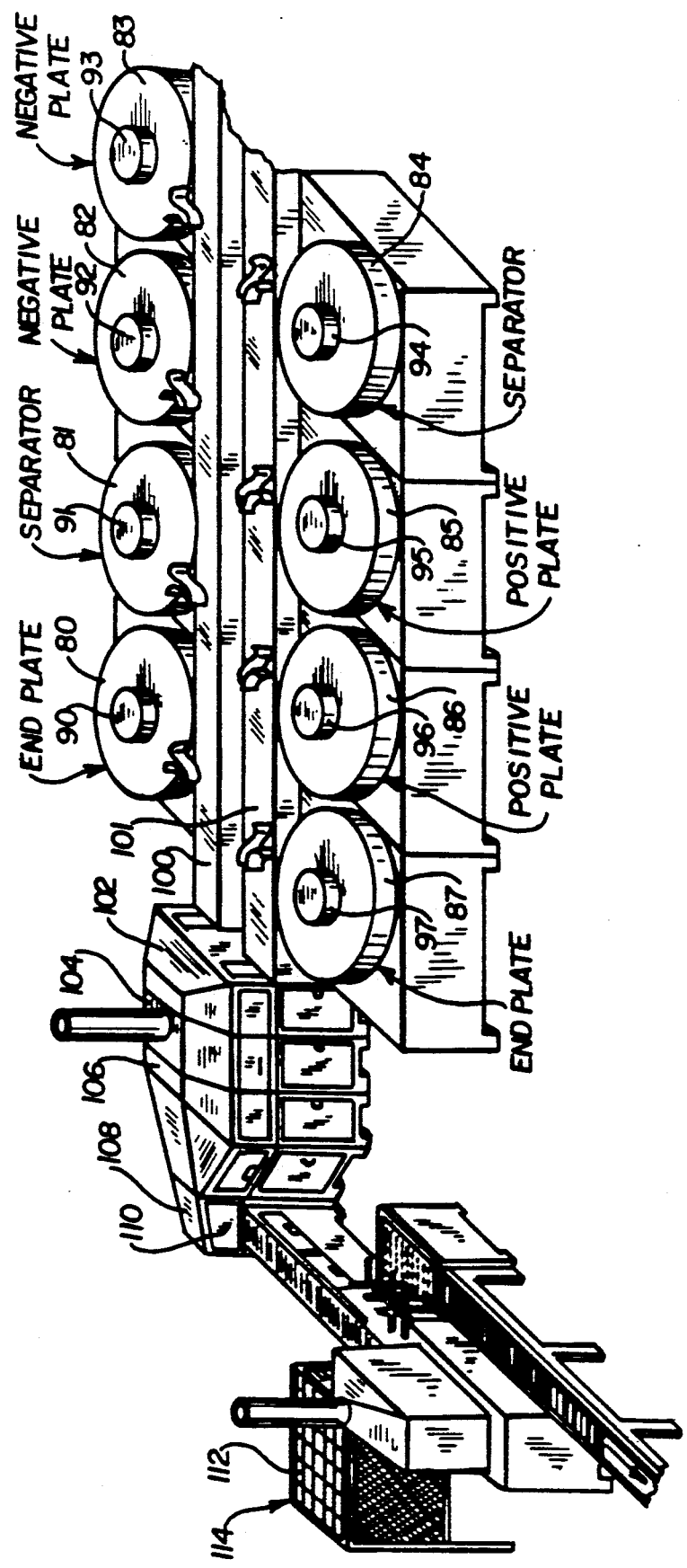
FIG. 5 is a perspective view of a portion of the apparatus employed in the manufacturing process of the invention.

FIGS. 1A and 1B show part of the apparatus usable in the manufacturing process. These figures show the manufacturing of the grid (Aspect 1), the pasting of the grid to form the pasted plate (Aspect 2) and curing of the pasted plate (Aspect 3). FIGS. 2, 3, and 4 show the battery grid strip as it moves through the various manufacturing stages. FIG. 5 shows a perspective view of the apparatus employed in the elementizing step (Aspect 4) and the containerization step (Aspect 5). These figures provide an overview of the entire manufacturing process, the associated apparatus, and the associated parts of the improved lead-acid battery of the invention.

Referring more particularly to FIG. 1A, the process is initiated by making battery grid strip. This may be accomplished by using a conventional continuous casting line 2 such as one manufactured by the Wirtz Company, Model No. CC-1000 for example. The battery grid strip 6 that emerges from the casting line 2 has a shape and configuration which can be seen by observing the expanded view of the lead grid at FIG. 2. FIG. 2 will be explained in more detail hereinafter with respect to FIG. 6.

After emerging from the casting machine 2, the strip 6 is rotated 90° so that it can be taken up by a coiler 8 which is part of a grid coiler machine 10. The coiled grid 12 is then lifted from the grid coiler 10 by a coil handler monorail means 14. The monorail means 14 consists of a gantry system having an overhead crane 16. The overhead crane 16 lifts the coil 12 off of the grid coiler machine 10 and the coil can then be aged or stored or can be placed directly on a grid uncoiler 20.

Referring more particularly to FIG. 1B, the grid strip 6 is then run off the grid uncoiler 20 into the pasting machine 22. A bottom layer of paper 24, which is fed from a roll 26 of paper mounted on the pasting machine 22, is placed underneath the grid strip 6. The pasting machine 22 may be of conventional design, and operates by receiving the leady oxide paste 30 into a hopper 32 for distribution on the grid strip 6. The battery paste 30 is deposited on the reticulated grid wire portion of strip 6 (explained further hereinafter) and some of the paste goes through the lead wire grid of grid strip 6 and rests on the bottom layer of the paper 24.

After the paste is applied, a top layer of paper 40, which comes off a roll of paper 42 is applied to the now pasted grid strip 6. The pasted battery strip 50, with a top and bottom layer of paper, emerges from the pasting machine 22 in the form of FIG. 3.

After pasting, the pasted battery plate strip 50, which is driven by the coiler 74, passes an idler roll 52 and then passes through two sets of orientation rollers 54, 56 and 58, 60. These rollers rotate the strip 50 from a horizontal position to a vertical position, as can be seen at 61.

Once the strip 50 is turned on its side, it passes through two sets of profiling rolls 62, 63 and 64, 65. Rolls 63 and 65 are only partially shown. These rollers "profile" the pasted battery strip. This will be described in further detail hereinafter. The profiled and pasted battery strip 72 has a configuration as is shown in FIG. 4. After this, the pasted and profiled battery plate strip 72 is coiled by a coiler machine 74 onto coil 76.

The coil 76 is then taken by overhead crane 78 to the curing chambers 79. The battery plate strip coil will cure in the chambers 79 for a desired period of time. This curing process will also be further described hereinbelow with reference to Aspect 3.

After curing, the battery element is stacked, accumulated, cut ("elementized"—Aspect 4), and then placed into the battery container ("containerized"—Aspect 5). A perspective view of the apparatus employed in these two aspects is shown in FIG. 5. FIG. 5 shows various coils 80, 81, 82, 83, 84, 85, 86, and 87 of pasted plate stock, separator stock, and "winged end plate" stock (all of these terms being explained hereinbelow) on respective uncoiler means 90, 91, 92, 93, 94, 95, 96, and 97. The various stocks of material from coils 80-87 are uncoiled by the uncoiler means 90-97 and fed into one of two channels 100 and 101. The channels 100 and 101 lead into a lug brush section 102 which prepares the negative and positive plates for cutting and indexing. After this the pasted plate stock and the other elements are "indexed" by indexing means 104. After this, the lug is formed by lug forming means in the lug blanking section 106. The blanked and indexed strip is then cut by cutter 108 to element size.

The various parts of the battery elements are then aligned by alignment means 110 and placed into containers 112 which are located on racks 114. Once containerized, the positive and negative lugs are fused by molten lead (plate strap), the container is inverted, the intercell connections are made and the battery container and cover are sealed together. Finally, the positive and negative posts are formed in the cover, the acid is added, and the battery is formed.

As will be appreciated, the hereinbefore discussion is a broad general overview of several aspects of the invention. A detailed discussion of each aspect, the associated apparatus, and the associated product, will be discussed further hereinafter.

ASPECT 1

Figure 6:
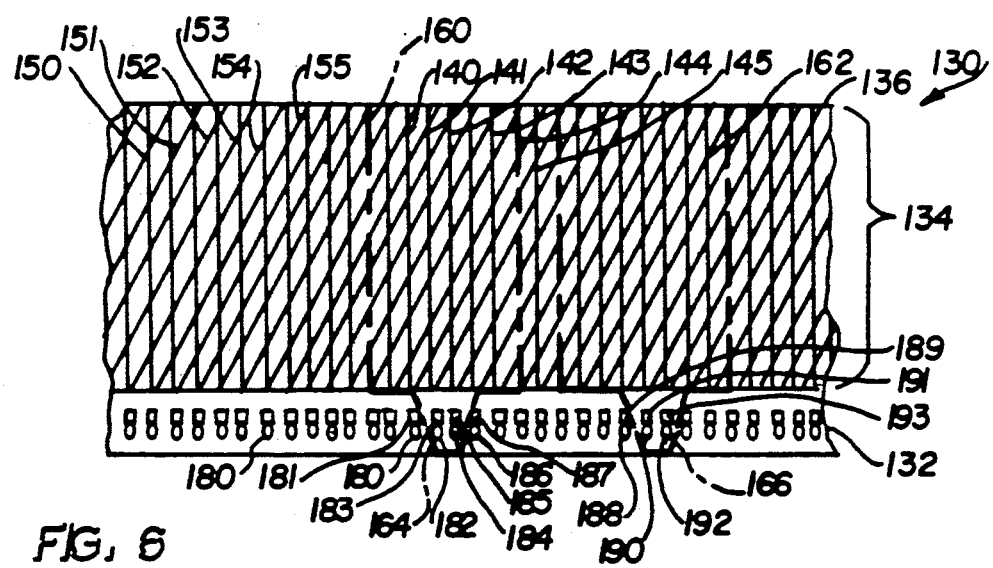
FIG. 6 is an expanded, front elevational view of a portion of the battery grid strip of FIG. 2.

A preferred section of the battery grid strip 50 is shown in FIG. 6. FIG. 6 shows the same section as does FIG. 2, but in greater detail. The battery grid strip 130 consists of a solid lug strip portion 132 a reticulated grid wire portion 134 extending from the lug strip portion 132, and a border portion 136. As described in connection with FIG. 1, the battery grid strip 130 is made of lead and may be produced by a continuous casting method.

The reticulated grid wire portion 134, has a universal pattern having a "short repeat". This pattern consists of a plurality of vertical wires 140, 141, 142, 143, 144, and 145, for example, that are uniformly spaced along the lug strip portion 132 and border portion 136 and generally perpendicular thereto. Wires 150, 151, 152, 153, 154, and 155 are also provided. These wires 150-155 run diagonally and meet the lug strip portion 132 at an angle of less than 90°, as can be seen with wires 154 and 155.

As can be seen in FIG. 6, a battery grid 160 (shown in phantom) can be punched from any part of the battery grid strip 130 and can have the same basic design as any other battery grid, such as battery grid 162 (also shown in phantom). Also shown in phantom is battery grid lug 164 formed from the lug strip portion 132. Battery grid 162 also has a battery grid lug 166. These lugs will be discussed further hereinafter. The battery grid strip 130 can be used in the production of battery plates which can differ widely in width of the grid and the lug and, therefore, can be used in the production of batteries which differ in size and performance. There is no need to have different dimensioned battery grid strip. This greatly reduces the battery grid and battery plate inventory required, mold and tooling costs, and the labor required to change from one battery size to another.

Figure 7:
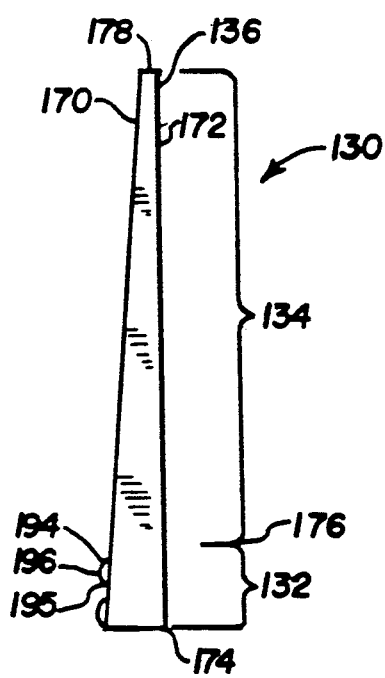
FIG. 7 is an expanded, side elevational view of the portion of the battery grid strip of FIG. 6.

When produced by continuous casting, the battery grid strip 130 normally has one tapered side 170 and one flat side 172 as can be seen in FIG. 7. FIG. 7 shows a greatly exaggerated side view of the grid strip portion 130 that shows the taper of the grid strip portions from the lug strip portion 132 to the border 136. The degree of taper can be about 0.001° to 1° with about 0.2° to 0.5° being preferred. Any taper which accomplishes the goals of (i) progressively increasing conductivity from the bottom portion of the grid to the top portion containing the lug, and/or (ii) providing a means to lock the lug into the cast-on plate strap, can be used. A preferred configuration for the grids can have a thickness of about 0.02 to 0.125 inch with about 0.025 to 0.05 inches being the preferred dimension at point 174 of the strip 130, which tapers uniformly to about 0.015 to 0.115 inches with 0.02 to 0.04 inches being the preferred dimension for the thickness at bottom 176 of the lug strip portion 132 and which tapers further to about 0.01 to 0.105 inches with 0.015 to 0.03 inches being the preferred dimension at a point on the border portion 178. The taper of the wires located between point 176 and point 178 normally conforms generally with the dimension at point 176 at the bottom of the lug strip portion 132 and with the dimension of the border 136. Tapered grids can also be produced from sheet metal by the metal expansion process by the use of crowned strip which is thicker at the center than at the edges and/or by permanent mold casting or gravity or die casting of single or multiple grids, for example.

The tapered section, which is thicker at the lug strip portion 132 than at the border 136, produces a battery grid strip 130 in which the conductivity increases progressively from the bottom border 136 to the lug strip portion 132. Also, the lug strip portion 132 is thicker at the top than at point 176 which is where the lug strip portion 132 meets the reticulated grid wire portion 134. This provides additional "locking" of the lug strip 132 in the plate strap which is placed on the plates in the containerization process.

Another advantage of tapering the thickness of the lug strip 132 is that, for a given conductivity, the lug strip 132 can also taper in width (being narrower at the top than at the bottom), thereby reducing the width of the plate strap. This, in turn, yields a substantial reduction in the amount of lead required in the plate strap.

Referring again to FIG. 6, the lug strip portion 132 contains projections 180, 181, 182, 183, 184, 185, 186, 187, 188, 189, 190, 191, 192, 193 for example. The projections 180, 182, 184, 186, 188, 190, 192, are preferably formed in one row on the lug strip portion 132 and projections 181, 183, 185, 187, 189, 191, and 193 are formed on another row on the lug strip portion. The projections 180-193 are preferably formed in the lug strip portion 132 during the casting operation. The projections are shown protruding outwardly from the lug strip portion (FIG. 7). The projections can also protrude inwardly from the lug strip portion. It will be appreciated that different numbers of rows and different arrangements of the projections can be used. One advantage of the preferred arrangement shown in FIG. 6 is that battery grid lugs 164 and 166 may be punched from any portion of the lug strip portion 132 and can have the same basic design.

As a less preferred, but alternate approach, the protrusions could be limited solely to the top portion of the lug strip relatively close to free edge thereof. That portion containing such protrusions could be later severed from the remainder of the lug strip. Such portion may be integrally formed with the remainder of the lug strip or may be a separate piece attached thereto. The term lug strip or lug strip portion as used herein shall be deemed to include such constructions, in the absence of an express indication to the contrary regardless of whether they are unitary or multi-piece.

Figure 8:
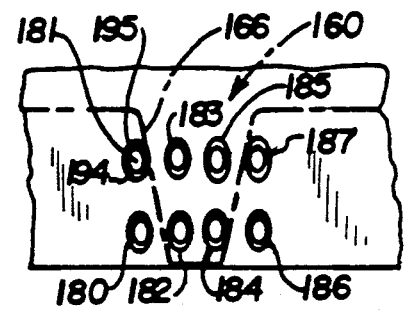
FIG. 8 is an expanded view of a section of the lug strip showing the lug strip protrusions.

The preferred shape of the lugs 180-193 and generally uniform spacing between lugs of a given row are illustrated in FIGS. 6, 7, and 8. As can be seen, a preferred shape of the lug projections 180-193 is an oval measuring about 0.07 to 0.09 inches in diameter. The lug protrusion 180 projects from the outer surface of lug strip portion such that two angled portions 194 and 195 meet to form a generally flat portion 196. The lug projects about 0.04 to 0.05 inches from the lug strip portion 132.

The projections 180-193 provide several benefits in the battery making process described in FIG. 1. First, they facilitate removal of the battery grid strip 130 from the casting mold made by the continuous casting of the lead into the battery grid strip. Second, they provide strength to the battery grid strip 130 which enables thinner grid sections to be handled without damage. Third, they provide a means of driving the battery grid strip 130 automatically in subsequent plate forming operations. That is, the lug protrusions aid in carrying the grid from the continous casting line, to the coiler, uncoiler, and paster as was shown in FIG. 1. Fourth, they provide a means of locking the lug into the cast-on strap when the cell is fabricated thereby preventing the plate from losing contact if a metallurgical bond is not achieved. Fifth, they automatically provide space between laps of the coiled and pasted battery plate strip after the battery grid strip is pasted and is formed into a coil.

Holes can be substituted for the projections to achieve "lug locking" and allow the strip to be driven through subsequent operations. It will be appreciated that holes, indentations from the inner surface, or grooves can also be used to provide some of the same benefits as the lug projections discussed hereinabove. The lug strip, therefore, needs only to have a non-coplanar section to effectively operate. The non-coplanar sections can be continuous along the lug strip or can include intermittent sections along the lug strip, as desired. For example, the lug strip could contain an elongated ridge that extends the full length of the lug strip. As used herein, the term "non-coplanar" includes cast-in sections and/or physical deformations in a solid section, such as protrusions or indentations, as well as non-planar discontinuities, such as holes. It will also be appreciated that the lug strip can use combinations of holes, indentations or grooves.

Forming of the lug strip projections 180-193 is not limited to the continuous casting process of the invention. The projections on the lug strip can be formed by conventional expanded metal processes by passing the strip through a set of opposed cooperating rolls which create an embossed rib or projection in the lug strip. Alternatively, a set of reciprocating dies can be used. The shape, height, and pattern of the projections can be as described herein for continuously cast strip. This lug strip detailing can take place (i) before the starting sheet stock enters the expansion machine, (ii) as part of the reciprocating motion of the expansion machine during the expansion process or, (iii) after the expanded strip exits the expanding machine.

ASPECT 2

The next aspect of the invention involves battery plate manufacturing and the resulting battery plate design. As was discussed with respect to FIG. 1, the battery grid strip 6 is passed through a pasting machine 22 in which the pasted grid stock is placed in between sheets of paper 24 and 40 that sandwich the pasted strip 50. The pasted strip 50 emerges from the pasting machine and is subsequently oriented to stand vertically by orientation rolls 54, 56 and 58, 60. The rolls 62, 63 and 64, 65 then form the profile on the plate. After formation of the profiled plate, it is coiled by coiler 74 and placed on coil 76 and then taken to the curing chamber 79 for further processing.

Figure 9:
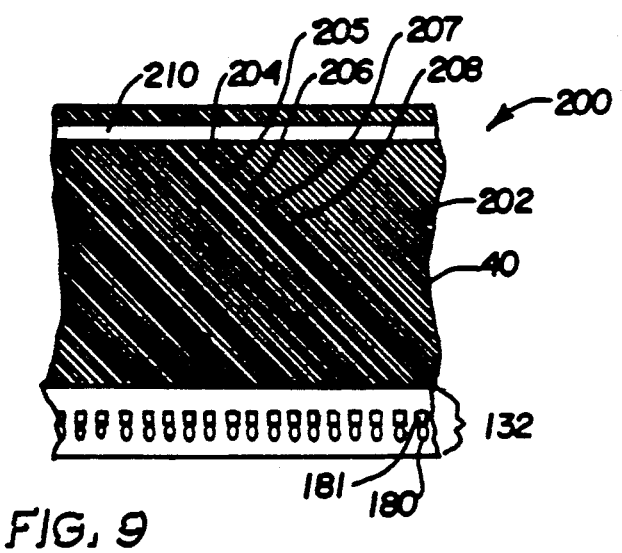
FIG. 9 is an expanded elevational view of a portion of the pasted and profiled battery plate strip of FIG. 4.

FIG. 9 shows a portion 200 of the profiled battery plate strip 50 as produced by the method of the invention. FIG. 9 shows the same portion of the battery plate strip as does FIG. 4 but in greater detail. The battery plate strip portion 200 consists of the battery grid strip described hereinbefore and a paste layer material 202 as applied by the pasting machine as was discussed with respect to FIG. 1. The battery plate strip portion 200 has a top layer of paper 40 and a bottom layer of paper 24 (not shown).

The battery plate paste material 202 used will depend on whether it is desired to manufacture positive or negative plates. If a coil of positive plate stock is desired to be made, the mixture which is fed into the hopper of the pasting machine may, for example, consist of about 300 pounds of oxide, 0.198 pounds of binder material, 18.3 liters of water, and 9.1 liters of $H_2SO_4$. The density of this material is typically about 69 grams per cubic inch. If a coil of negative plate stock is desired to be made, the mixture which is fed into the hopper of the pasting machine may consist, for example, of 300 pounds of oxide, 0.198 pounds of binder, 2.9 pounds of expander, 18.1 liters of water and 12.3 liters of $H_2SO_4$. The density of this material is typically about 67 grams per cubic inch.

The battery plate 200 has a profile pattern with grooves 204, 205, 206, 207, and 208, for example, which are at angle relative to the top border of the plate that is, greater than about 45° and less than 90° with about 50° to 70° being preferred with respect to the border portion of the battery grid on either side of a perpendicular line drawn from the border portion. The grooves are formed through the paper 40 and into the paste material 202 by the rollers 62, 63 and 64, 65 described in connection with FIG. 1. This will not only resist gas entrapment between the plates and separators, but also will assure efficient battery acid circulation once the battery plates are in operation. One groove is disposed about 0.01 to 0.03 inches apart from the next adjacent groove. The profile also includes an area of restricted width which forms a channel 210 along the bottom edge of the profiled battery plate strip 200. This channel 210 meets all of the profile grooves on the pasted battery plate strip. This will provide for battery acid circulation as will be described hereinbelow.

It will be appreciated that FIG. 9 shows only one side of the pasted strip. The other side will have the same profile and channel as does the side shown in FIG. 9. It will also be seen from FIG. 9 that the lug strip portion 132 and lug strip protrusions (for example, lug strip protrusions 180 and 181) are not pasted.

FIG. 10 shows a greatly expanded side elevational view of the pasted and profiled battery strip. It can be seen that the battery plate is tapered from top to bottom corresponding to the taper of the battery grid strip 130 shown in FIG. 6. The battery plate 200 has a generally flat side 212 and a tapered side 214, similar to that of the battery grid strip 130. The battery paste layer is also tapered. The paste thickness at the border 211 of the lug strip 132 and the reticulated grid portion can be from 0.03 to 0.16 inches with 0.04 to 0.07 inches being preferred. The paste thickness near the border portion 136 (FIG. 10) is from about 0.01 to about 0.15 inches with about 0.025 to 0.05 inches being preferred. Also shown are the projections 180 and 181 near the top of the battery plate 200. Projection 180 projects about 0.04 to 0.05 inches from the surface of lug strip portion 132. The lug strip portion 132 is not covered with battery paste 202. The plate is also provided with channels 210 and 210a which intersect most of the grooves in the plate.

Both sides of the battery plate 200 are overpasted so that battery paste extends beyond both sides of the reticulated grid portion 134 as can be seen in FIG. 10 by observing the phantom drawing of the battery grid strip 130. Also, there are profile grooves on each side of the battery plate. FIG. 10 shows the cross-sectional shape of one of the grooves 204. This preferred profile has two tapered sides 215 and 216 and a flat bottom 217. The thick portion between grooves is identified as reference number 219. This profile maximizes the surface area of the battery plate and optimizes paste flow in the profiling process. FIG. 10 also shows a portion of top 24 and bottom 40 paper layers as formed on the battery plate. It will be appreciated that the paper layers 24 and 40 completely cover the pasted portion of the plate. The entire covering is not shown to enhance the clarity of FIG. 10.

The dimensions of the groove 204 are measured using surface 218 of the battery grid 130 as a base or reference level. The thickness of the paste from the grid surface 218 to the flat bottom 217 portion of the groove is preferably about 0.003 to 0.01 inches with 0.005 to 0.007 being preferred. The thickness of the paste from the grid surface 218 to the thick portion 219 is preferably about 0.016 to 0.026 inches with about 0.018 to 0.024 being preferred. The length of the flat bottom 217 is about 0.01 to 0.02 inches with about 0.013 to 0.017 inches being preferred. The length of the thick portion 219 is about 0.018 to 0.028 inches with about 0.02 to 0.025 inches being preferred. The tapered sides 215 and 216 have identical lengths of about 0.015 to 0.025 inches with about 0.01 to 0.02 inches being preferred. The tapered sides are at an angle of about 45° to 75° with about 58° to 62° being preferred with respect to the grid surface 218.

FIG. 10 shows the grooves ("valleys") on the tapered side 204 being opposite the thick portion ("hills") on the flat side 212. Valley 220 (which is identical to groove 204 described hereinbefore) is directly opposite "hill" 221. Also, hill 222 is opposite of valley 223. This pattern is known as "hill-to-valley". FIG. 11 shows a "hill-to-hill" or "valley-to-valley" configuration. Here hill 224 of the tapered side 214 is opposite to hill 225 of the flat side 212. Valley 226 is also opposite valley 227.

This profiled battery plate 200 increases the surface area of the battery plate, provides channels for controlled gas movement and acid recirculation and increases the strength of the plate. The tapering of the plate provides a greater amount of active material at the top of the plate.

The method of the invention for Aspect 2, as was referred to in the discussion of FIG. 1, is as follows. First, a layer of paper is placed on the belt. Second, the grid strip is placed on top of the layer of paper. Third, the grid strip is pasted on a belt paster in a manner which results in one side being "overpasted" to the desired thickness and such that the paste is tapered in thickness from the bottom of the lug strip portion to the bottom border. Fourth, a layer of thin absorbent paper is fed into the paste machine on top of the pasted plate strip. Fifth, the pasted plate strip is preferably rotated 90° to now stand vertically. Sixth, the pasted plate strip/paper composite is passed through a roller which forces a portion of the paste from the overpasted side of the plate strip to flow through the interstices of the reticulated grid portion of the grid strip to the opposite side of the plate strip where it is then distributed uniformly so that the grid strip is "overpasted" on both sides. Seventh, both surfaces of the plate strip are profiled (as shown in FIGS. 10 and 11) to increase the surface area of the plate strip, densify both plate strip surfaces, and firmly embed the paper in the paste on both sides of the plate strip. This produces grooves and a channel on each side of the plate strip. Finally, the pasted strip is coiled on a vertical coiler (lug side down) on a pallet containing openings which permit the movement of air through the adjacent wraps of the plate strip. This will be explained hereinafter in greater detail with respect to the discussion of FIGS. 12-15.

The act of forcing the paste from one side of the reticulated grid portion of the grid strip to the other and profiling the plate strip on both sides may be performed by passing the pasted plate strip through either one or two sets of synchronized rolls which first act to force the paste through the grid strip and then act upon the paste on both sides to achieve a uniform layer containing the desired profile embossed thereon. These two sets of profiling rolls were mentioned with respect to FIG. 1.

Referring to FIGS. 12-15, the method for pasting and profiling the battery plate strip will be discussed in detail. FIG. 12 illustrates the method of placing the bottom layer of paper 24 underneath the battery grid strip 130.

The paper 24 is fed off roll 26 by means of a pair of drive rollers 231 and 232. Any type of battery grade paper, such as that sold under the trade designation "Crystex" or any type of "tea bag" paper will be sufficient. The paper 24 is driven by drive rollers 231 and 232 at a ratio of speed of about 1.3:1 to the rate at which the grid strip 130 is fed into the paster. As a result, the paper has a length that is greater than the battery grid strip 130 that it will be underneath. The paper must have increased length because the battery plate is going to be profiled. This paper 24, which has its actual length per unit of "apparent" length increased, will avoid adhesion problems noted with some papers which are fully stretched and stressed in tension prior to the profiling step. Fully stretched and stressed paper tends to pull away from the profiled surface after profiling.

Before contacting the grid strip 130, the paper 24 is wrinkled by paper sizing rolls 233 and 234. These rolls feed the paper 24 to the grid strip 130 at a ratio of 1:1 to the rate at which the grid strip 130 is fed into the paster 22. These rollers 233 and 234 are therefore driven at a slower rate than rollers 231 and 232. This, along with the configuration of the rollers 233 and 234 causes the paper 24 to wrinkle as at 236. The wrinkled paper 236 and the grid strip 130 contact each other on the steel belt paster pulley belt 238. This belt paster pulley belt 238 is driven by roll 240. The bottom layer of wrinkled paper resists the paste from the pasting machine from contacting the steel belt paster pulley belt 238.

In lieu of using the paper sizing rolls, crepe paper or prewrinkled paper can also be used for the bottom layer of paper 24. The paper 24 can have a thickness of about 0.001 to 0.003 inches with 0.002 inches being preferred.

Figure 13:
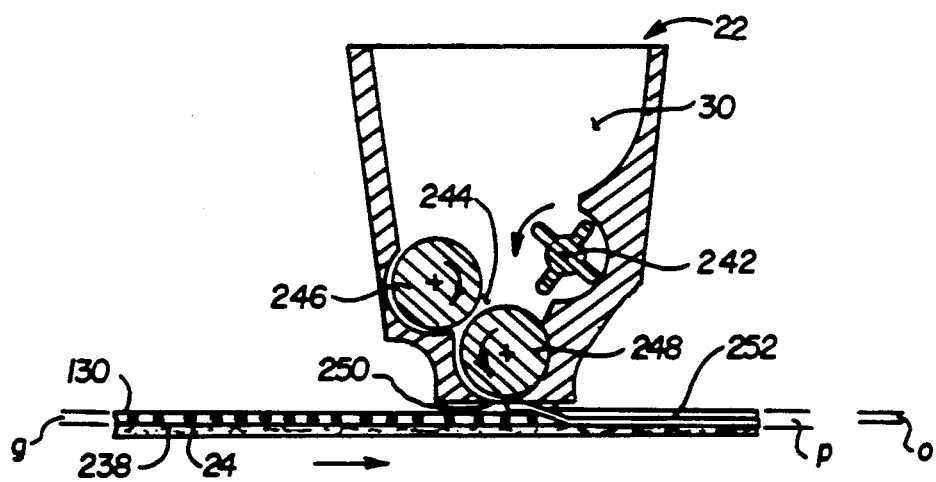
FIG. 13 is a side elevational view, partially in section, of the pasting machine showing the paste being applied to the battery grid strip.

The next step is introducing the paste onto the battery wire grid strip 130. This is shown in FIG. 13. The pasting machine 22 is filled with the leady oxide paste 30 described hereinbefore. The paste 30 is forced downward by gravity and by a roller 242 into an orifice 244 formed by two other rollers 246 and 248. The rollers 246 and 248 rotate in the direction of the arrows. The two rollers 246 and 248 insure that an even amount of paste to be deposited on the passing grid strip 130.

The grid strip 130, with a bottom layer of paper 24, passes under the opening 250 in the pasting machine 22, and the paste is deposited on the top of the grid strip 130. Opening 250 is angled so as to place a greater amount of paste on the grid strip near the lug strip portion than at the bottom portion of the grid strip. This will aid in forming the tapered battery paste desired as shown in FIG. 10. Because of the rotation of roller 248, the paste is forced onto the top of the grid strip 130 a slight distance from the opening 250. The amount of paste deposited on the grid strip 130 can be controlled by the rollers 246 and 248 and the size of the orifice 244 and opening 250.

After it is deposited on the grid strip, some of the paste 30 will flow through the reticulated grid portion 134 of grid strip 130 and will rest on top of the bottom layer of paper 24. The grid strip 130 is preferably "overpasted". That is, the thickness "p" of the paste is greater than the thickness of the wire grid "g". The thickness of the overpasted top side "o" is equal to "p" minus "g". As discussed hereinabove, the battery paste is tapered so that a greater thickness of paste is present on the grid strip near the lug strip portion than at the bottom portion of the grid strip. The overpasted strip 252 then emerges from the pasting machine 22.

Figure 14:
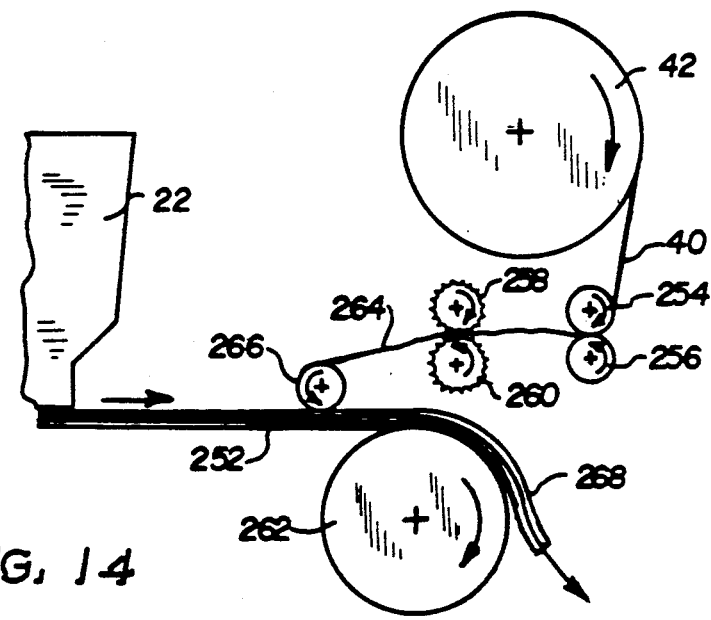
FIG. 14 is a side elevational view of the top layer of paper being applied to the top of the pasted battery grid strip.

The top layer of paper 40 is then applied to the overpasted plate stock 252. Referring to FIG. 14, the top layer of paper 40 is taken off roll 42 by means of a pair of drive rollers 254 and 256. As with bottom paper layer 24, the paper 40 is driven by the drive rollers 254 and 256 at a ratio of speed of about 1.3:1 to the rate at which the overpasted plate stock 252 is fed from the pasting machine 22. The paper 40 has a length that is greater than the overpasted plate stock 252 on which it is on top. The paper must have increased length because the plate is going to be profiled. This paper 40, which has its actual length per unit of "apparent" length increased, will resist adhesion problems noted with some papers which are fully stretched and stressed in tension prior to the profiling step.

Figure 15:
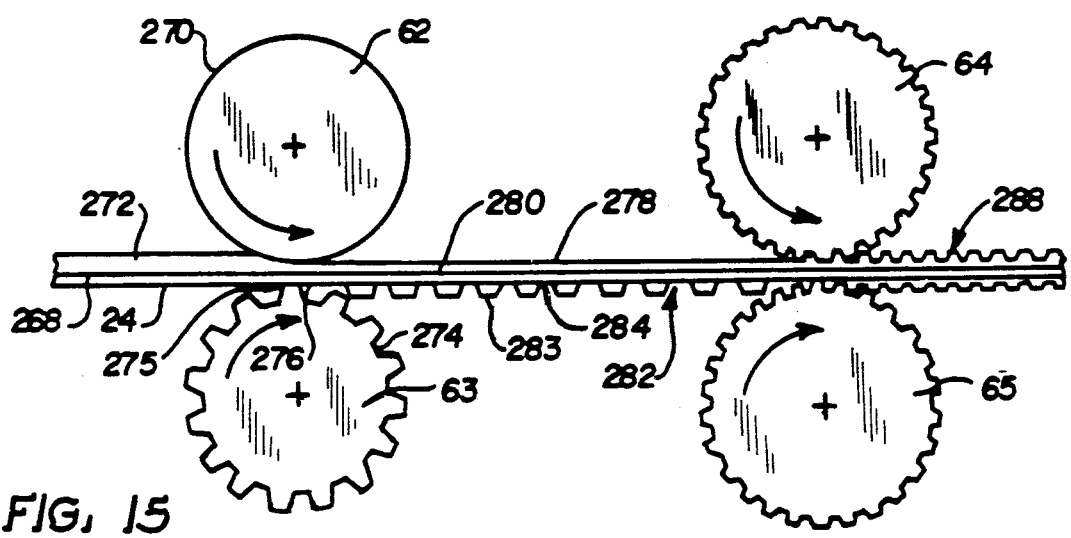
FIG. 15 is a top plan view of the battery grid strip with the overpaste layer of paste being fed into the two sets of profiling rolls.

Before contacting the grid strip, the paper 40 is wrinkled by paper sizing rolls 258 and 260. These rolls feed the paper 40 to the overpasted plate stock 252 at a ratio of about 1:1 to the rate at which the overpasted plate stock 252 is driven by the steel belt paster belt pulley 262. As is obvious, these rollers 258 and 260 are driven at a slower rate than rollers 254 and 256. This, along with the configuration of the rollers 258 and 260 causes the paper 40 to wrinkle as at 264. The wrinkled paper 264 is taken over a paper application roll 266 which in turn places the wrinkled paper on the overpasted plate stock 252. The pre-profiled battery plate stock 268 is then driven by the steel belt paster belt pulley 262 to the profiling rolls (FIG. 15).

It will be appreciated, as with the bottom layer of paper 24, that crepe paper or prewrinkled paper can be used for the top layer of paper 40. This paper can have a thickness of about 0.001 to 0.003 inches with 0.002 inches being preferred.

The overpasted plate stock 252 has a top layer 40 and a bottom layer of paper 24. As was shown in FIG. 1, the pre-profiled battery plate stock 268 is then oriented to stand vertically by orientation rolls 54, 56, and 58, 60 and then is profiled by profiling rolls 62, 63 and 64, 65. It is preferred that the stock 268 is oriented so that the lug strip is at the bottom of the stock 268. These profiling rolls are shown in greater detail in FIG. 15, which is a top plan view of the overpasted strip going through the two sets of profiling rollers.

Profiling roll 62 has a flat, smooth outer surface 270 which contacts the layer of overpaste 272. This action forces approximately half of the overpaste volume through the reticulated grid 134 to contact profiling roll 63. The profiling roll 63 has grooves 274 which preferably have a 112 pitch and which is in contact with the layer of paper 24 on the opposite side of the pre-profiled battery plate stock 268. The flat roll 62 forces paste to flow through the grid stock to the opposite side where it is moved into the grooves 274 on roll 63. This can be seen by observing the forced through paste 275 and the paste 276 in the groove shown in FIG. 15.

The partially profiled battery plate stock 278 emerges from the first set of rolls 62, 63, as is shown in FIG. 15. The layer of paste 280 is still flat and smooth, whereas the layer 282 has "hills" 283 and "valleys" 284. The partially profiled battery plate stock 278 then is driven into the second set of profile rolls 64, 65. The layer of paste 280 is then profiled by roll 64. Roll 64 has a similar configuration as roll 63, only it is preferred that roll 64 have a greater pitch (here, about 224) than roll 63. At the same time, roll 65 is further profiling layer of paste 282. Roll 65 has a greater pitch (here, about 224) than roll 63, and the same pitch as roll 64 in order to form the same number of grooves per unit area on one side of the plate stock as on the other.

The profiled plate stock 288 emerges from the two sets of profile rolls 62, 63, and 64, 65 and is wrapped around a powered coil, lug strip portion down, as was described in connection with FIG. 1.

It is preferred that the overpasted plate stock 252 be oriented by rolls 54, 56, and 58, 60 to be passed through the rollers 62, 63 and 64, 65 so that the lug strip portion is facing down. As discussed with respect to FIG. 10, the battery paste layer is thicker at the border 211 of the lug strip and the reticulated grid portion than at the bottom border 136. In order to form this tapered surface, the profile rollers 62, 63 and 64, 65 are formed and/or positioned so as to provide the plate with more paste at the top border 211 than at the bottom border 136 of the strip. This can be accomplished by orienting the axes of the rollers slightly inwardly from being straight up and down vertically or by providing conical shaped rollers having a greater diameter at the top than at the bottom. In addition, the rollers can be adjusted so that more pressure is placed on the top of the rollers so that paste is forced downwardly on the pasted plate.

Both sets of rolls 62, 63, and 64, 65 may be individually powered but are preferably of the "idler" type driven by an external force. If individually powered, the speed of both sets must be synchronized. It is preferred that both sets of rolls be idler rolls which are driven by interacting the rolls with the protrusions 180–193 on lug strip portion 132 as the battery grid strip 130 is pulled through the rolls by the powered coiler 74 (FIG. 1).

Figure 16:
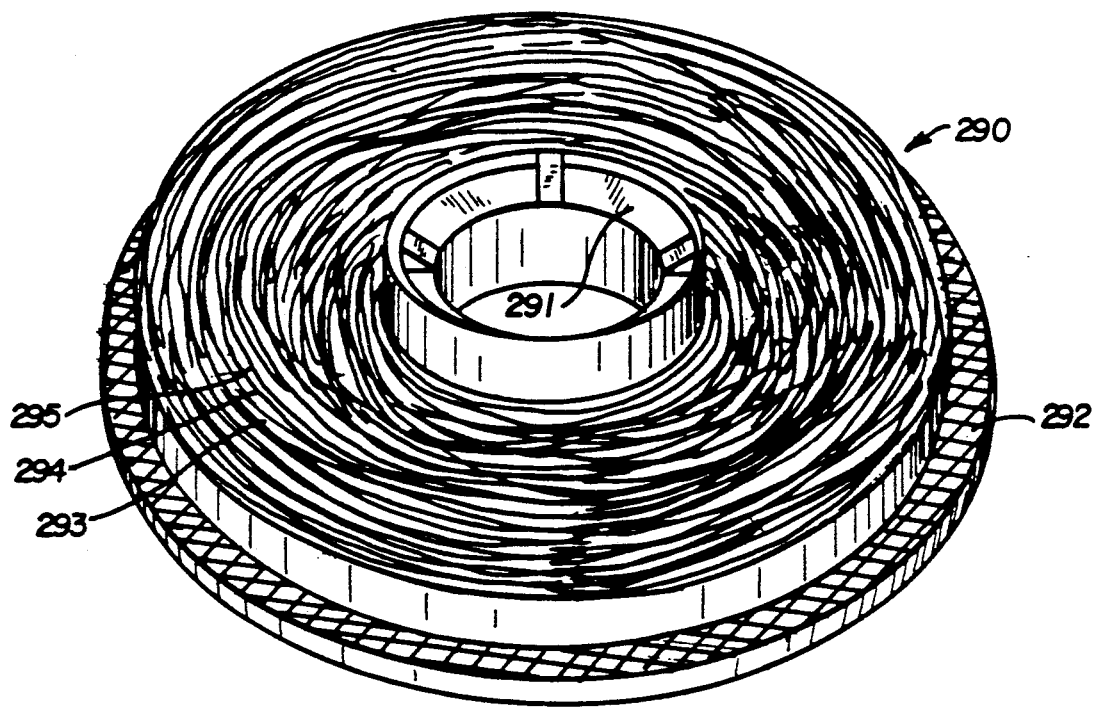
FIG. 16 is a perspective view of a coil of pasted battery plate as produced by the method of the invention.
Figure 17:
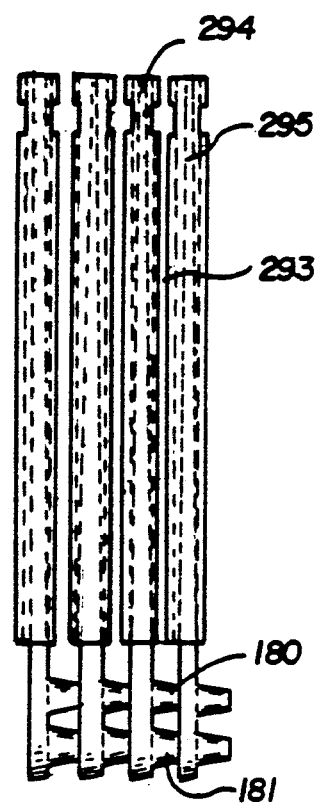
FIG. 17 is a fragmentary illustration of a portion of the coil shown in FIG. 16 showing the spaces between adjacent wraps of the pasted battery plate.

Referring now to FIG. 16, the coil of pasted plate stock 290 is shown. The coil 290, is preferably mounted on a hub 291 and flat pallet 292. In order to provide ventilation to the coil 290, the pallet 292 can have a series of holes (not shown). The coil 290 is characterized by a gap 293 between adjacent wraps 294 and 295 of battery plate stock. This gap 293 is created by the lug protrusions 180 and 181, for example, on the lug strip portion 132 which are sized to extend slightly beyond the thickest portion of the profile. This gap 293 is shown in FIG. 17 which shows a detailed view of the space between the adjacent wraps 294 and 295. Gap 293 averages about 0.005 to 0.025 inches with 0.01 inches being preferred between the peaks of the profiles on the adjacent laps 294 and 295. In lieu of the lugs on the lug strip, the gap between adjacent wraps can also be achieved via the use of a removable belt which is wrapped with the coil or by coiling the pasted battery plate strip on a grooved pallet which accepts the wraps and provides the required spacing. The removable belt can be placed adjacent to the lug strip.

ASPECT 3

The third aspect is curing of the coil 290 of pasted battery plate stock. Curing the pasted stock oxidizes any free lead, removes residual water in the plate and converts the paste to a strong crack-free mass that can be easily handled.

Figure 18:
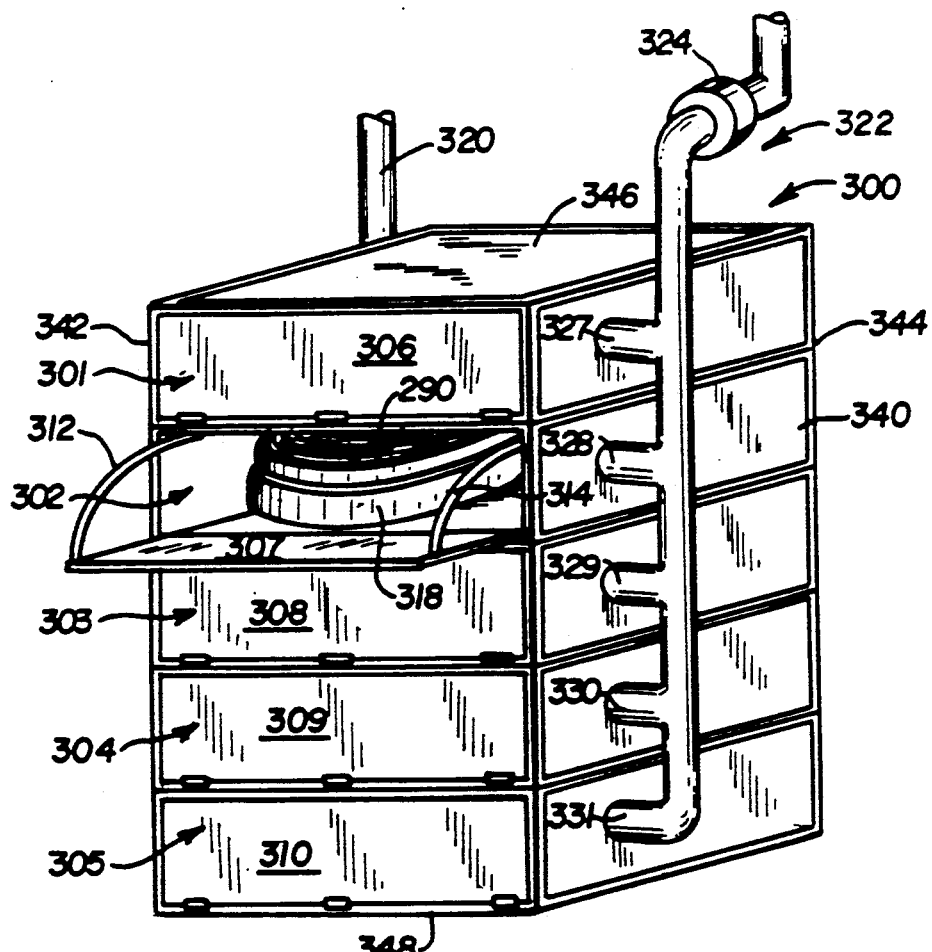
FIG. 18 is a perspective view of the curing chamber of the invention.

Chambers for curing the coils were shown in FIG. 1. A representative curing chamber 300 is shown in FIG. 18. The chamber 300 preferably has five sections 301, 302, 303, 304, and 305 which are each capable of holding one coil. Coil 290 is shown in section 302. Each section 301–305 has a door 306, 307, 308, 309, and 310 which is hingedly connected to the chamber 300 by a pair of hinges such as 312 and 314 (shown for section 302 only). Each section includes heating means 318 (shown for section 302) which provides heat to the coil to accomplish the curing. The heat is controlled by a thermostat (not shown) and is also controlled with respect to the supply and exhausting of air into the chamber. If desired, each section can hold more than one coil.

The chamber 300 is equipped with fresh air supply means 320 and exhaust means 322. The exhaust means 322 has an associated fan 324 mounted near the top of an exhaust pipe 326 having branches 327, 328, 329, 330, and 331 in communication with each section 301-305, respectively. Fan 324 will act to draw the air out of the chamber 300 in order to control the curing of the coils.

The curing chamber is equipped with programmable controllers that control the heat and humidity of the atmosphere inside the chambers which in turn determine the ratio of tri-basic to tetra-basic lead sulfate. These controllers are well known to those skilled in the art.

Referring again to FIG. 18, the chamber 300 is preferably about eight feet, seven inches wide by about eight feet, seven inches deep by nine feet high. The chamber 300 has three sidewalls 340, 342, and 344, a roof 346, and a base 348. The sidewalls 340, 342, and 344, roof 346, and base 348 are preferably constructed with a twenty gauge steel exterior and an aluminized steel interior. The sidewalls 340, 342, and 344 and roof 346 are preferably filled with three inches of semi-rigid buff insulation. The chamber 300 requires electrical service of 460 volts, 3 phase, 60 hz, approximately 80 amps.

The controls for the chamber 300 include a motor starter, contactor, push buttons, pilot lights, fused branch circuits, a 110-volt control transformer, and a main disconnect switch with a door interlock. A wet wick assembly having automatic float control is provided. Finally, oven temperature protection will be provided by a non-indicating excess temperature controller with manual reset wired to shut off the heat in the event of an over temperature condition.

The method of the invention involves the steps of providing one coil 290 (FIG. 16) of pasted battery plate stock having a space 293 formed between adjacent wraps 294 and 295 as described hereinabove and placing the coil 290 in a section 302 of chamber 300 from instantaneously to three hours after the battery plate stock has been pasted. After this, heat is applied to the coil 290 by means of the heating means 318, which can be electric or gas type of heating, in the section 302 of the chamber 300 so that an exothermic reaction in the pasted battery plate stock is started. After the desired chemistry of the plate has been achieved, the moisture content of the plate is reduced to start the oxidation of free lead in the coiled plates. To achieve this, ambient air in the chamber is exhausted through exhaust means 322 and is replaced by fresh air, delivered through fresh air means 320. For example, fresh air can be introduced into the chamber for ten seconds every minute. This fresh air, which is preferably cool, dry outside air, is preferably taken from the atmosphere surrounding the chamber 300. The coil 290 is then removed from the chamber, and is allowed to dry at room temperature.

An alternate method involves placing a coil 290 in the chamber 300 immediately after the pasting operation has been completed. When more than one coil is placed in a single station, the first coil is placed in the confined volume of a section 302 of the curing chamber 300 immediately after pasting and the door of the section 302 is closed to retain moisture evaporating from the coil. This procedure is repeated with each subsequent coil which is stacked on top of those already in the chamber until the desired number of coils are in the chamber. The number of coils in the stack is limited only by the height of the section and the number of coils which can be produced within the time period before the first coil loses sufficient water to begin an uncontrolled exothermic reaction. (Example: 6 coils per section over a 2.5-hour period.)

The method of and apparatus for the curing of the pasted battery plate stock is not limited to coils of pasted battery plate stock. A rack which contains strips of pasted battery plate stock can also be placed in the curing chamber 300. It is desired that spaces be maintained between adjacent strips of pasted battery stock so that air can circulate around the surface area of the pasted battery stock.

ASPECT 4

Figure 19:
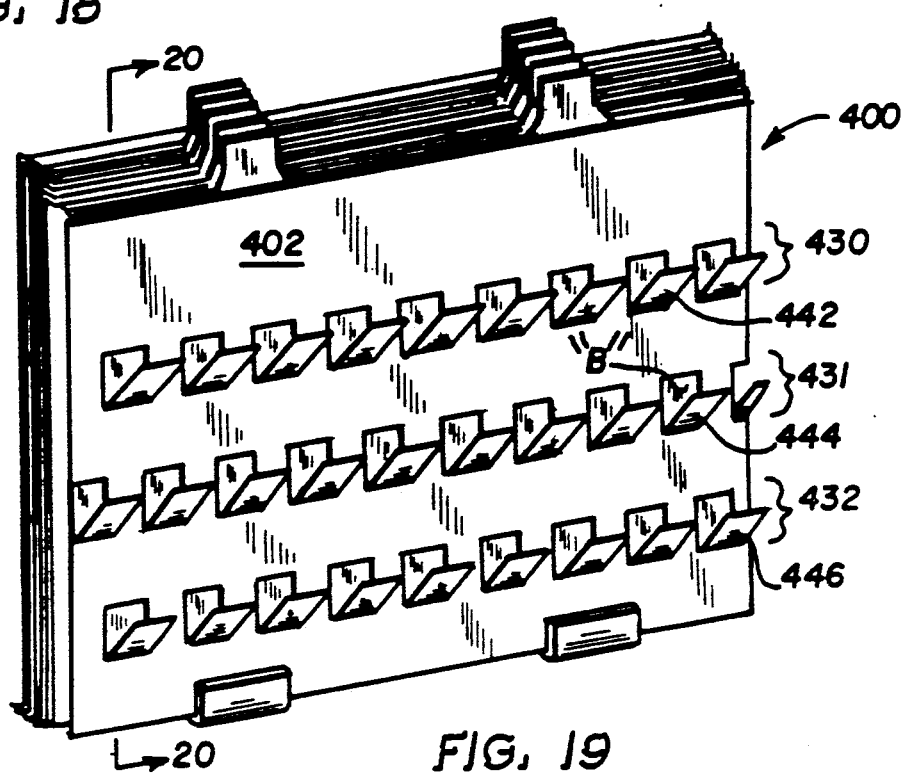
FIG. 19 is a perspective view of a battery element of the present invention.
Figures 20, 22:
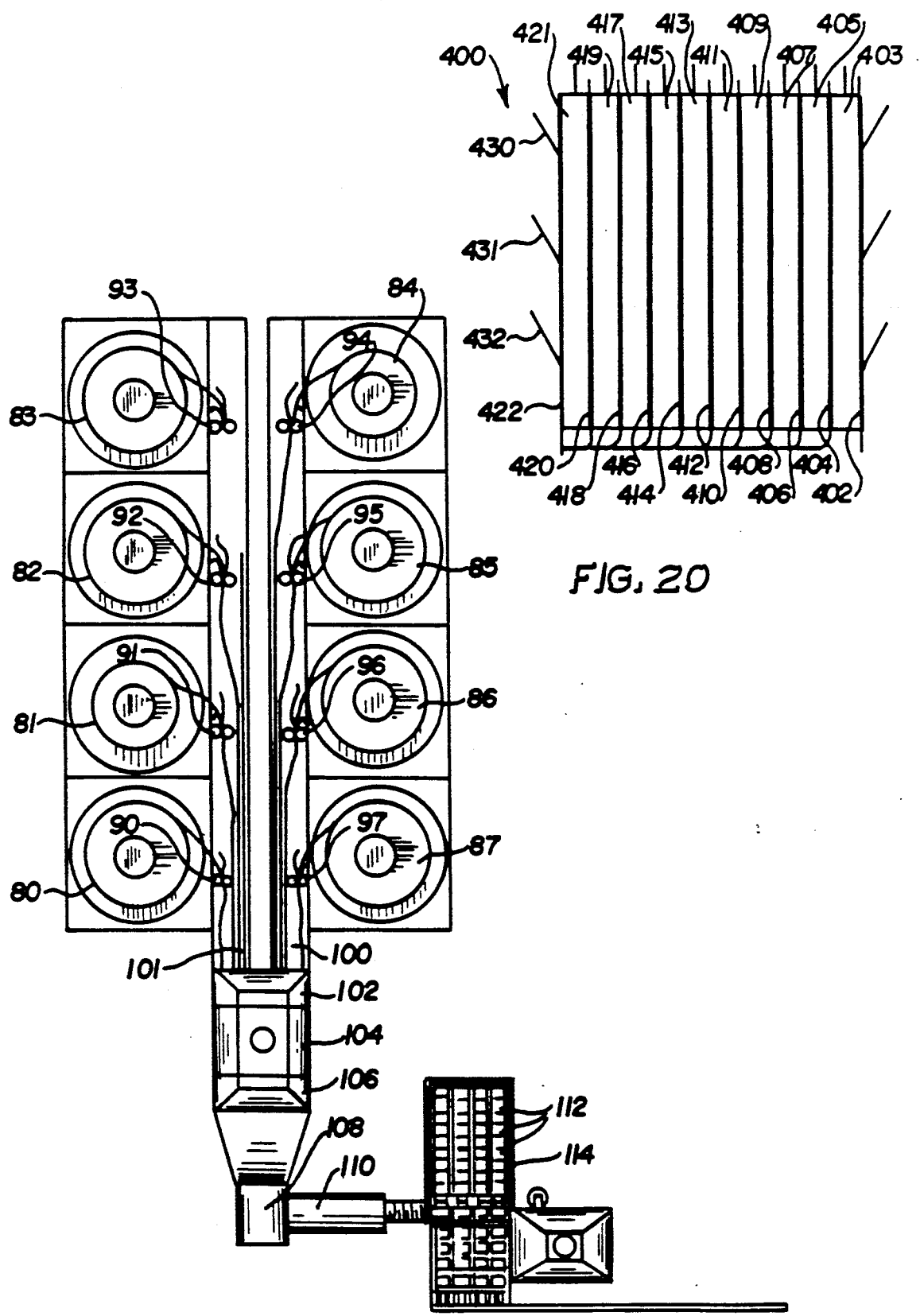
FIG. 20 is a greatly expanded side elevational view of the battery element shown in FIG. 19.
FIG. 22 is a top plan view of the elementizing and containerization apparatus.

The next aspect of the invention involves the battery elements. A battery element 400 constructed by the method of this invention is shown in FIGS. 19 and 20. This element comprises a first winged end plate 402, a positive battery plate 403, a separator 404, a negative battery plate 405 and another separator 406. The element is further comprised of alternating positive battery plates 407, 411, 415, and 419 separated by separators 408, 410, 412, 414, 416, 418 and 420 from negative battery plates 409, 413, 417, and 421. A second winged end plate 422 is the last part of this battery element.

Thus, the battery element 400 design comprises two winged end plates 402 and 422 located on opposite sides of the element to make up the outside surfaces of the element 400. These are positioned such that a row of wings 430, 431, 432 extend from the battery element 400 generally outwardly and downwardly from the surface of the end plate (as the element 400 is positioned during assembly) at an angle of less than about 90° from the horizontal. Second, the element design includes positive and negative plates that are each profiled as was discussed hereinabove with respect to Aspect 2. This plate design provides a grooves between the paste and the next adjacent separator. Further, the design has flat sheet separators 408, 410, 412, 414, 416, 418 and 420 located between each positive plate or 403, 407, 411, 415, and 419 and each negative plate 405, 409, 413, 417, and 421. The separators extend beyond the periphery of each plate or group of plates on all sides.

FIGS. 19 and 20 also show the overlapped portions of the separators 404, 406, 408, 410, 412, 414, 416, 418 and 420 on all sides (the two vertical edges, the top and the bottom). The separators are folded back on the two vertical edges and the bottom over the exposed edges of the plates and overlap at least one other separator. The separators are bonded to at least one other separator in a manner which electrically insulates the plates one from the other. This will be shown with respect to FIG. 28.

Figure 21:
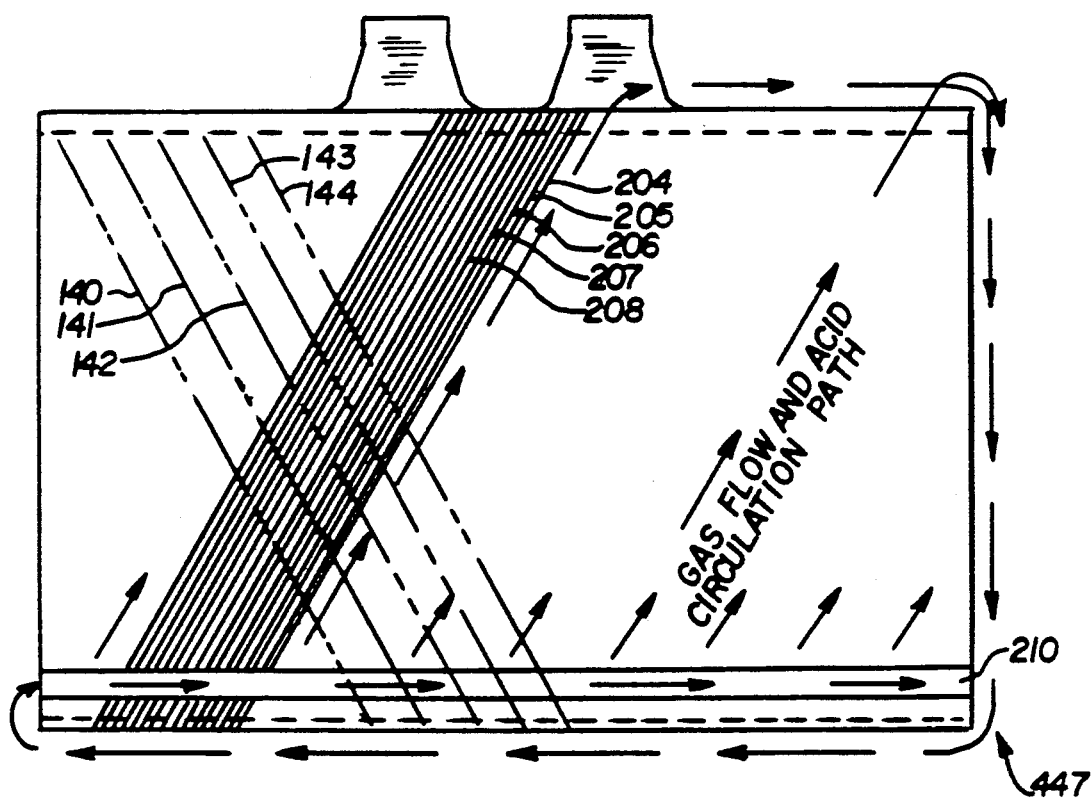
FIG. 21 is a side elevational view of a battery plate showing how the battery acid circulates thereon.

The separators are overlaped in a manner which allows acid to flow into the element through an unsealed corner. Referring to FIG. 21, the acid flows (acid flow indicated by arrows) in from the corner 447 through an opening (not shown) in the joined separator, along the space between the reduced width channel 210 running along the bottom of the plate and the separator, up the profiled grooves 204, 205, 206, 207, 208 to the top of the plate or to a vertical space which exists between the vertical edge of the plate and the folded separator. Thus, it will be appreciated that the diagonal grooves and the reduced width channel in cooperation with the flat separators provide an improved battery acid circulation in the battery element. FIG. 21 also shows that the grooves 104 preferably run in a diagonal direction that is opposite of the diagonal grid wires 140-144. This increases the overall strength and rigidity of the plate.

The winged end plate 402 is shown in FIG. 19. The "winged" end plate may consist of a single piece of relatively rigid polymeric material which is resistant to sulfuric acid. The winged end plate 402 preferably has three rows 430, 431, 432 each having several protrusions, for example, 442, 444, and 446 running across the width of the plate and extending downward at an angle of less than about 90° from the vertical. These protrusions are flexible and resilient and can be deflected in a direction towards the end plate without being permanently deformed and losing their resiliency. They function as leaf springs. The end plate 402 is about 0.05 to 0.07 inches and preferably 0.06 inches thick to provide rigidity. The "wings" 442, 444, and 446 are about 0.03 to 0.07 inches and preferably 0.04 inches thick and are oriented at an angle "B" of about 60° from the surface of the end plate 402, as illustrated in FIGS. 19 and 20. These winged end plates will be discussed further hereinafter in Aspect 5.

Referring now to FIGS. 5 and 22, the method of manufacturing the battery cell element 400 will be discussed. FIGS. 5 and 22 show the coils 80-87 of positive and negative pasted plate stock, separator stock, and winged end plate stock. FIG. 22 shows a top plan view of the elementizing apparatus and the containerization apparatus of FIG. 22. Coils 81 and 84 are coils of plastic separator stock. Coils 80 and 87 are coils of winged end plate stock as was described with respect to FIGS. 19 and 20. Coils 85 and 86 are positive plate stock and two coils of negative plate stock, 82 and 83, are provided. Coils 82, 83 and 85, 86 are produced and cured by the methods described with respect to Aspects 2 and 3. It will be appreciated that this is a preferred arrangement of the various coils of materials. Different arrangements and different numbers of the various coils can be used, if desired.

The various strips of material from the various coils are fed into channels 100 and 101 by respective uncoilers 90-97. The coils 80-87 rotate about a generally vertical axis.

The material then enters the elementizer. The elementizer in the form shown consists of the lug brush section 102, the indexing section 104, and lug blanking section 106. Also, cutter 108 is part of the elementizer as is element alignment tunnel 110.

Figure 23:
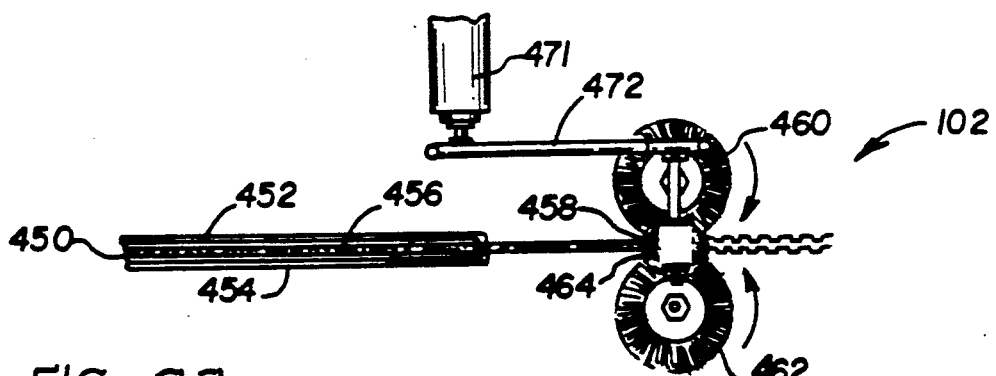
FIG. 23 is a top plan view of the lug brush section of the elementizer.
Figure 24:
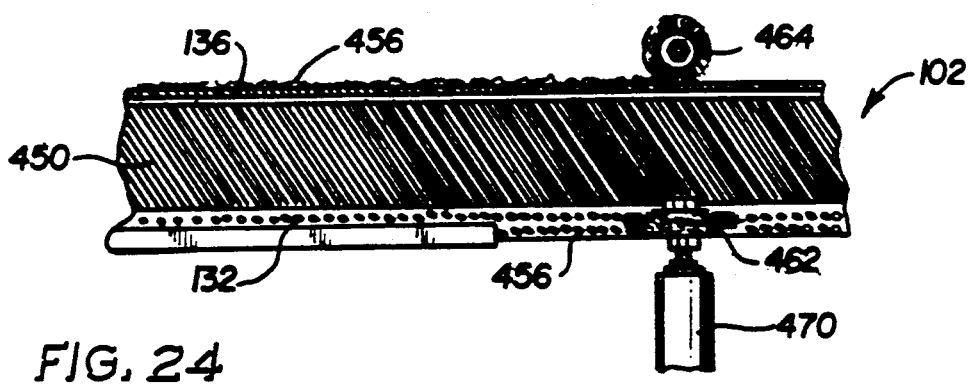
FIG. 24 is a side elevational view of the lug brush section of the elementizer.

The lug brush section 102 is shown in more detail in FIGS. 23 and 24. Only the positive and negative pasted battery plates are acted on by the lug brush section 102. The lug brush section 102 brushes the bottom border and the lug strip portion of the positive and negative pasted battery material to prepare it for cutting, stacking, and aligning in the elementizer. The purpose of the brushes is to remove surface paste build-up on the lug strip and bottom border to provide a better cast-on strap bond. The end plates and separators pass through the lug brush section 33 unaffected by the brushes.

FIGS. 23 and 24 show how the lug brush section 102 cleans positive plate stock 450. As discussed hereinbefore, the plate stock 450 is fed from one of the coils in an upright position. The plate stock 450 is held in that position by a pair of oppositely spaced guide strips 452 and 454. The lug strip portion 132 and the bottom border 136 of the plate stock 450 have loose dried battery paste 456 that must be removed. The plate stock 450 enters an orifice 458 disposed between two brushes 460 and 462 having vertical axes and one brush 464 having a horizontally disposed axis. Brushes 460 and 462 are driven preferably by 1800 rpm motors. FIG. 24 shows motor 470. Brush 464 is driven preferably by 1800 rpm motor 471 through a pulley and belt means 472 which powers rotary brush 464. The brushes 460, 462, and 464 all can pivot in and out of contact with the plate stock 450. The plate stock 450 will move through the lug brush section 102 at approximately 24 inches per second. The plate stock 450 emerges from the lug brush section 102 cleaned of debris and ready for further processing.

The brushes 460, 462, and 464 will rotate when the plate stock 450 is being indexed (FIGS. 25 and 26) and stop when the plate stock 450 stops. In the alternative, the brushes 460, 462, and 464 will keep rotating and retract away from the plate when the strip is not moving.

Figure 25:
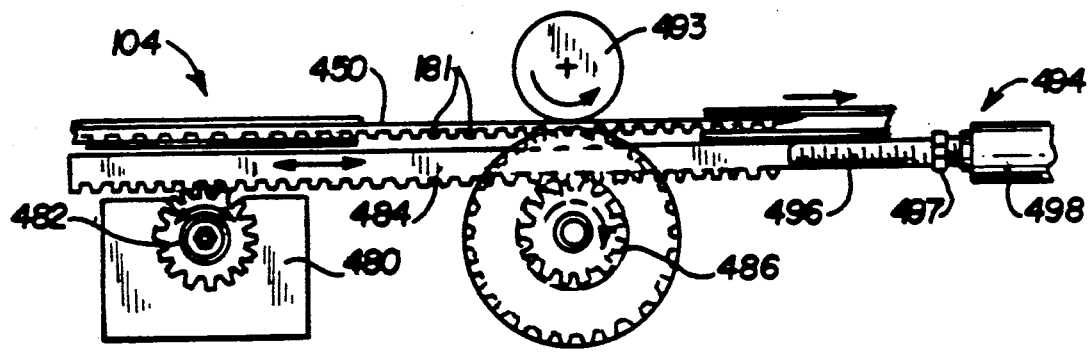
FIG. 25 is a top plan view of the indexing section of the elementizer.

The plate stock 450 is then moved to the indexing section 104. The indexing section 104 feeds the precise amount of plate stock 450 into the cutter 108 for cutting to form the element 400 of desired size. FIG. 25 shows the plate stock 450 after emerging from the lug brush section 102 and entering the indexing section 104.

The indexing section 104 consists of a drive motor 480 and pinion 482 which is associated with a rack 484, and a lug strip drive wheel 486 consisting of an axle 488 which is connected to a gear 490. The rack 484 drives the gear 490 which in turn rotates the driving roller 486. The driving roller 486 has protrusions 492 which mate with the lugs 180 and 181, for example, on the plate stock 450.

The drive motor 480 is preferably a stepper motor or rotary actuator which rotates a discrete amount to correspond to a linear distance that plate stock 450 is to be moved. This in turn moves the rack 484 forward (toward the right in FIGS. 25 and 26) thus turning the gear 490 and the axle 488 which in turn rotates the driving roller 486. The driving roller 486 then indexes a desired amount of plate stock 450 forward into the lug blanking section 106 for subsequent processing. After this, the stepper motor 480 reverses rotation, which in turn reverse rotates the pinion 482. This moves the rack 484 backwards (towards the left in FIGS. 25 and 26). The gear 490 does not rotate backwards because it is equipped with a clutch bearing (not shown) that permits rotation in only one direction. Once the rack 484 is back in position, another section of plate stock 450 can be indexed for subsequent processing. A back-up roller 493 provides back pressure to keep the lug strip in positive contact with lug drive wheel 486.

In order to assure the proper indexed length for the plate, an adjustable index stop 494 is preferably provided. This consists of a threaded metal bar 496 having associated therewith a fixed bolt 497. The metal bar 496 can be adjusted by motor 498.

Figure 26:
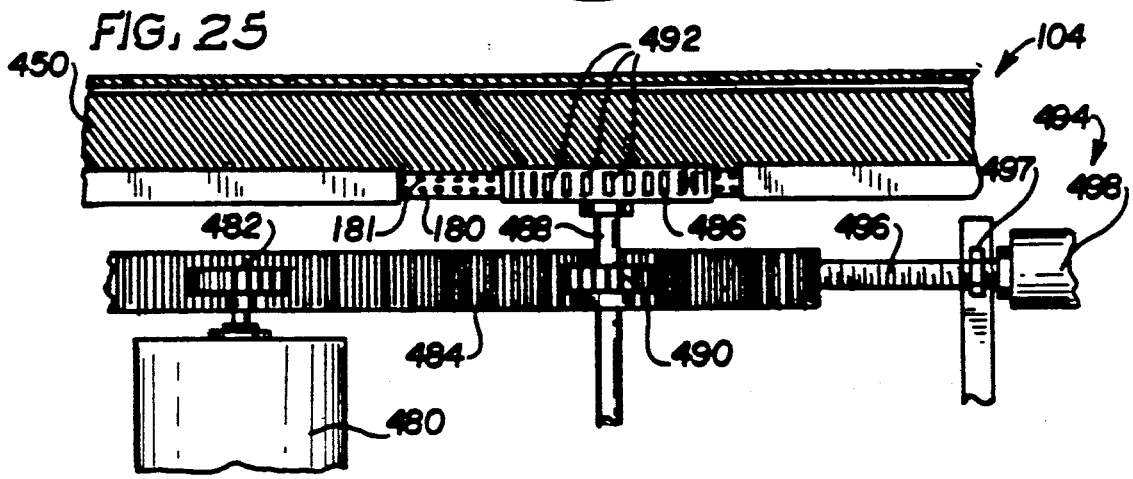
FIG. 26 is a side elevational view of the indexing section of the elementizer.

FIGS. 25 and 26 shows the indexing for the positive and negative plates only. As for the separators and winged end plate, a similar apparatus is used, except that those driving rollers are smooth as opposed to driving roller 486 which has protrusions which mate with the lugs on the positive and negative plates.

Figure 27:
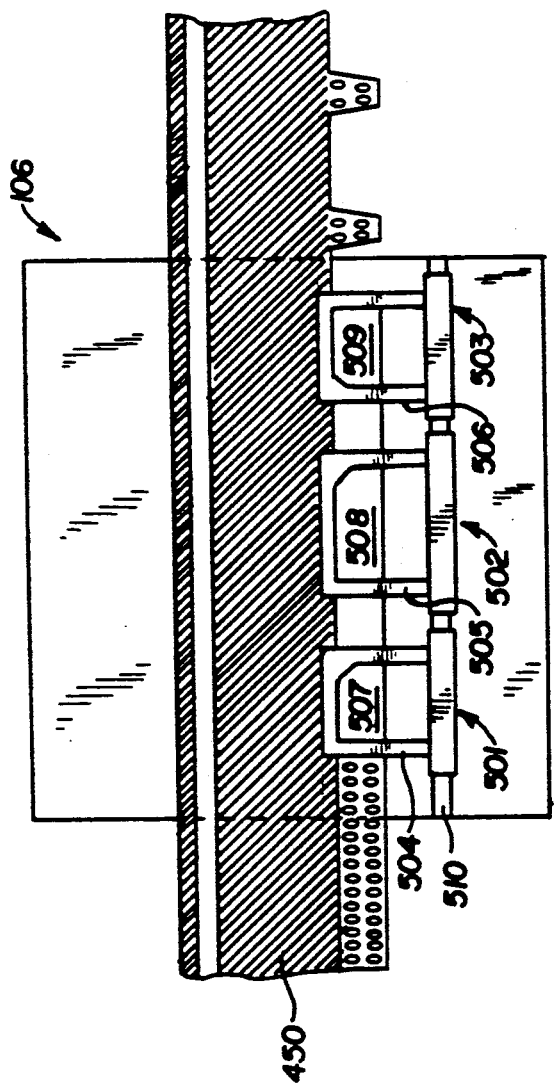
FIG. 27 is a side view of a battery plate strip going through the lug blanking section of the elementizer.
Figure 28:
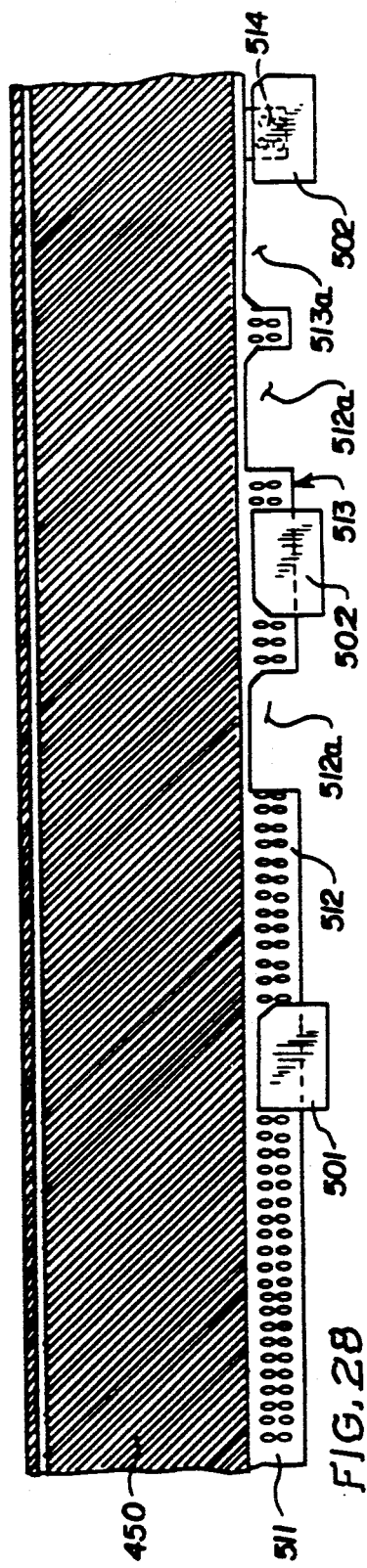
FIG. 28 is a schematic view of how the lug is formed by the lug blanking section shown in FIG. 27.

After the positive and negative plates, separators and winged end plates have been indexed, the positive and negative plates enter the lug blanking section 106. This is shown in FIGS. 27 and 28. The lug blanking section 106 consists of a plurality of lug blank stations 501, 502 and 503. These lug blank stations each consist of respective punches 507, 508 and 509 and associated dies 504, 505 and 506.

The respective lug blank stations are slidably mounted on a die mounting plate 510. It will be appreciated that the lug blanking stations can be moved into different positions on the die mounting plate 510 and can even be removed entirely from the die mounting plate by providing, for example, a coupler which wraps around the die mounting plate (not shown). It will be appreciated that more or less lug blank stations can be used to form different lugs on the plate stock 450.

As the plate stock 450 moves through the lug blanking section 106, the respective dies are activated to cut the lug strip portion to form the separate lugs. This is shown in FIG. 28, which shows the lug blanking section 106 making large SLI plates. The unblanked lug strip 511 is first cut by lug blank station 501. This creates a first partially blanked lug strip 512, having a blanked out portion 512a. After this, lug blank station 502 cuts the first partially blanked lug strip 512 to create the second partially blanked lug strip 513, having blanked out portions 512a and 513a. Finally, lug blanking station 503 cuts the strip 513 to remove the final piece 514 of the lug strip 511. After this, the indexed and lug blanked positive and negative plate and the indexed separator and winged end plate move to the cutting section 108.

Figure 29:
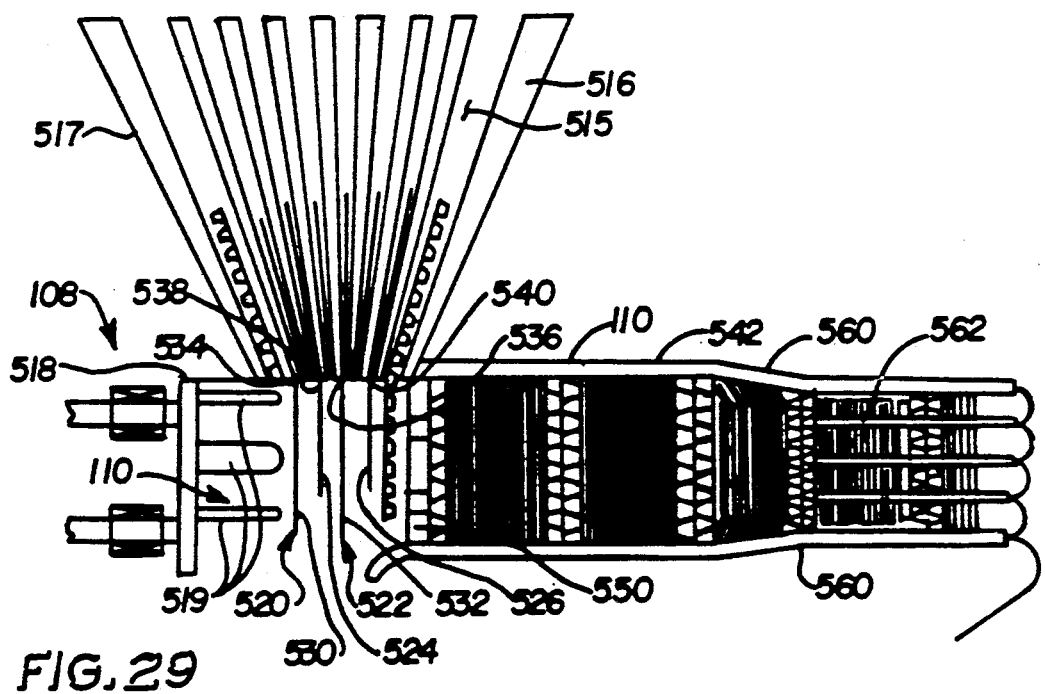
FIG. 29 is a top plan view, partially cutaway, of the cutting and alignment section of the elementizer.

The cutter 108 and alignment tunnel 110 is shown in FIG. 29. The materials from the various coils are fed from the lug blanking section 106 and the various materials are built-up or stacked to form the battery element described hereinbefore.

The cutting section 108 has a narrowed guide channel 515 formed by two inwardly tapered sidewalls 516 and 517 for guiding the various materials from the coils 80-87 into the cutting section 108. A reciprocating cutter 518 and a plate carrier means 519 are provided.

The separator index length is preferably longer than the plates. This can be seen by observing the separator stock 520 and 522 as compared to the negative plate stock 524 and the positive plate stock 526. When the separator stock 520 and 522 is cut the longer sides 530 and 532 thereof extend beyond the outer edge of the positive plate stock 526 and negative plate stock 524. The cut edge 534 and 536 is flush with the cut edge 538 and 540 of the negative and positive plate, respectively.

The plate carriers 519 secure the material when it is cut and carry it into the alignment tunnel 110. The plate carrier 519 is mounted with the cutter 518 and they make the same reciprocating movement. The plate carrier 519 retracts to make another cut and allows the next portion of plate stock 524 and 526 and separator stock 520 and 522 to index into the cutter 108. That plate stock 524 and 526 and separator stock 520 and 522 that was just placed in the alignment tunnel would fall back into the cutter section 108, after cutting, if not for the back pressure stop 550 that holds it in the alignment tunnel 110.

In order to equalize the longer sides 530 and 532 separator overhang to an equal amount on both sides of the plate, the plates must be shifted. This is accomplished by alignment means which consist of channels that engage the lug of the plate and that shift the plates to a position where the separator overlaps the plate on four sides of the plate.

The side guides 560 start with a full separator length dimension then gradually get closer together. As the separators fold over they start to overlap the separators behind them. Once the separators are overlapped, heat or ultrasonic sealing bars 562 will come in contact with the overlapped tops and seal them to each other. These sealing bars 562 are preferably resistance heated type bars. The side guides and sealing bars are also used in a similar fashion to fold and seal the sides of the element. Alternatively, as is known to those skilled in the art, the separator overlaps can be maintained by taping the overlap to an adjacent separator or by vibration welding.

The indexing and cutting operations are performed in such a manner that each separator is larger than the adjacent plates and, when properly aligned, extends beyond all four edges of the plates. The degree of overlap on the bottom and sides of the plate should be such that, when folded back tightly against these three edges, the separator overlaps at least one other separator in the stack (See FIGS. 19 and 20). The preferred overlap is about $\frac{1}{8}$ to $\frac{1}{4}$ inches. The degree of overlap at the top of the plate should be such that (i) the separator resists electrical shorting of adjacent positive and negative plates and (ii) the separator is shorter than the tab and does not interfere with the subsequent formation of the plate strap.

A preferred method of cutting each stack portion involves indexing each of the components into the cutting area 108, and cutting all layers with a single movement of the cutting device 518 as was described hereinbefore. In order to achieve the desired separator overlap, (i) the plate stock is fed vertically into the cutting section lug-side down with the lug riding in a slot below the main chamber, (ii) the depth of the slot relative to the height of the plate lug is such that top edge of the plate is above the main surface of the chamber by an amount equal to that by which the separator overlaps the top of the plate, (iii) the separator is indexed vertically into the chamber in such a manner that the bottom edge (which will become the portion overlapping the top edge of the plate when the element is turned right-side-up) and the leading edge extend beyond the leading edge of the plate by an amount equal to about dimensions twice the degree of overlap desired for the vertical edges of the plate, and (iv) the portion is held tightly and all layers are cut simultaneously with a single motion of the cutting device. The proper alignment of the separators and plates along the vertical edges, (i.e., the desired degree of overlap) is achieved by allowing relative movement between the separators and the plates when the element portion is moved to the accumulator station in such a manner that the plates slide forward towards the "double overlap" end of the separator by an amount which results in the overlap on both vertical edges being equal. This is accomplished by positioning the lug of the battery plates in a groove in the cutting area 108. The path of the groove cams the lug into the proper position.

Another method of alignment of the cut stack uses a thicker border on the flat separator to hold the plate position within the element stack. As an example of this technique, a separator with thicker borders on the top and bottom is indexed into the accumulator with the inverted top of the plate lug resting on the flat plate of the accumulator. As the cut stack of, for example, two separators and two plates is moved forward, the lugs drop into cut-outs in the accumulator plate and the plates slip downward until stopped by the thick border on the separator. This creates the designed separator overhang at both ends of the plates. The thickened border of the separator is outside the plate body and does not add resistance to the cell. The added strength in the separator may also assist in the processing operation. The inside edge of the border at the bottom of the element (top in the inverted position) is designed as the natural fold line for the element and, when folded over, adds a thicker section for protection against wear.

After this, referring to FIG. 29, the method of the invention provides urging the accumulated cell element into a tunnel-like section 560. The tunnel like section 560, has height and width dimensions such that, in order to pass along the tunnel, the separator overlaps along the bottom (positioned upwards in the tunnel) and both vertical edges of the plates are forced backwards and held tightly against the three edges of the plate. This way each separator overlaps at least one other separator in the stack.

Finally, each separator is then bonded to at least one other separator by heat sealing bars 562, as is shown in FIG. 29. If desired, other methods such as adhesive bonding, taping, vibratory welding, or any other method capable of joining the separator material to itself, to form a unitized cell element ready for application of plate straps and posts can be used. The separators are joined in such a way that the cell element is not fully sealed so that acid can enter in subsequent processes. It is preferred that the joining be accomplished in such a manner that acid can enter the element most easily at one lower corner, and more preferably, at the corner towards which the profiled grooves in the plates are angled.

For the particular element shown in FIG. 20, the element is preferably made in five steps. In the first step one layer of winged end plate, one layer of positive plate stock (lug down), one layer of separator, and one layer of negative plate stock (lug down), are fed into the cutter, (as seen in FIG. 29) indexed into position, and simultaneously cut by reciprocating cutter 518 to a predetermined size. The assembly is supported by back pressure stop 550. This portion of the stack is moved to an area adjacent the alignment tunnel 110 in which it and subsequent portions are accumulated until a complete cell stack is formed.

The second step involves feeding one layer of separator, one layer of positive plate stock (lug down), one layer of separator, and one layer of negative plate stock (lug down), into the cutter 518, positioning the layers and simultaneously cutting the layers to a predetermined size. This second portion of the stack is then moved into the accumulator area and aligned with the first portion of the stack. Steps three and four are the same as step two to accumulate the stack. Step five involves providing one layer of separator, one layer of negative plate stock, and one layer of winged end plate and feeding these layers into the cutter 108, positioning the layers, cutting, and moving them into the accumulator section where the back pressure stops 550 keep them from falling back into the cutter area 108. This layer is then aligned with the other portions completing the element stack.

It will be appreciated that the method of the invention, as well as the battery element produced by the method, is not limited to the configuration of the ten plate battery element described hereinbefore. The battery element of the invention can be, at a minimum, a positive plate, a separator and a negative plate. It will be appreciated that any number of plates above the minimum, and even beyond the ten plate element discussed hereinbefore, can be made by the method an apparatus of the invention. As described hereinbefore, the battery element can include a ten plate element, with five positive plates separated from five negative plates by interposed separators. In addition, there can be multiple positive and negative plates separated by individual separators. That is, a battery element can include a group of 2 or more positive plates separated from 2 or more negative plates by a separator positioned between the group of positive plates and the group of negative plates. It will be appreciated, that numerous combinations and numbers of the various components, i.e., negative and positive plates, end plate and separators can be employed with the method and apparatus of the invention.

ASPECT 5

The final aspect of the invention is the containerization step. FIG. 5 shows the containerization section. A plurality of the battery elements emerge from the alignment means 110 and are carried by a conveyor to a position adjacent a battery container magazine 114. The magazine has several rows and columns of battery containers 112. The containers 112 are loaded into the magazine 114 at either the container manufacturer's facility or at the plant location. The containers are loaded in an upside down position with the opening facing downward.

Figure 30:
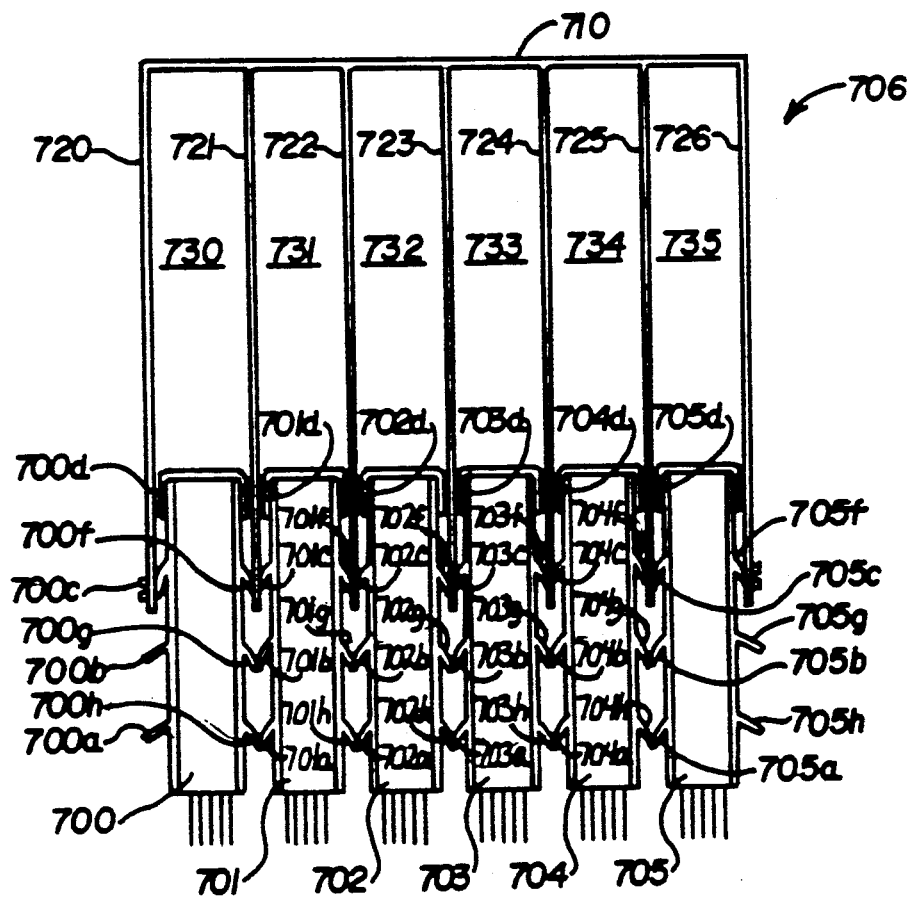
FIG. 30 is an elevational view of a battery container being slipped over a group of battery elements.

The battery elements are placed into the container as is shown by FIG. 30. A plurality of battery elements 700, 701, 702, 703, 704, and 705 having respective wings 700(a)-705(a), 700(b)-705(b), 700(c)-705(c), 700(f)-705(f), 700(g)-705(g), and 700(h)-705(h) are positioned in such a manner that the wings of one element, for example element 701 wings 701(a)-701(c) are in contact with the wings of an adjacent element 700, wings 700(f)-700(h). All of the wings are positioned so as to project in a downward direction. Also provided is tape means 700(d)-705(d) which serve to hold the elements in one unit. It will be appreciated that other means can be used to accomplish this purpose.

The battery container 706 consists of a base wall 710 and seven elongated vertical sidewalls 720, 721, 722, 723, 724, 725, and 726. The sidewalls 720-726 form six separate compartments 730-735 which hold the separate battery elements 700-705. The battery container 706 may be made of materials selected from the group of plastics, polypropylene, polycarbonate, rubber, and glass.

In the containerization process, the battery container 706 is slipped down over the desired number of elements. Alternatively, the elements 700-705 can be pushed into the container. The sidewalls 720-726 of the container 706 are aligned with the points at which the wings, for example, 700(f)-(h) and 701(a)-(c) of adjacent battery elements 700-701 are in contact. The container 706 is forced down over the elements 700-705 deforming the wings in a downward direction. The container 706 can be moved downward so that the elements enter the container with very little force required. The wings position the respective battery elements 700-705 in the center of the respective compartments 730-735 in the container 706 as well as providing a force which holds the battery elements 700-705 securely in the container 706. In addition, the wings provide a deterrent to the battery elements 700-705 falling out of the upside-down container 706, as forces applied in that direction would cause the wings to deflect towards the horizontal which, in turn, increases friction with respect to the sidewalls 720-726.

The container 706, positioning the elements 700-705 and holding them securely in place, is then moved to the containerization section 114 (FIG. 5). The containerization section 114 consists of a machine which simultaneously lowers the battery plate lugs of all of the elements in the container into molds containing molten lead. In the alternative, the molds of molten lead can be raised to contact the lugs. The molten lead melts a portion of the lugs and solidifies to form the plate strap. This whole process is well known to those skilled in the art and need not be illustrated herein.

In containerization, the container 706 is used as the unit of aligment for fusing the elements into a plate strap configuration. The containerization section 114, as is well known to those skilled in the art, will have several stations such as one for applying flux to the lugs, a station to check alignment, the cast-on station, a turn-over station, and push-down station to bottom the element in the container.

The container 706 is then inverted and the elements 700-705 are pushed down into the container 706. The elements 700-705 resist sliding down in the container 706 due to the friction between the wings and the sidewalls 720-726.

The wings of the element serve to mechanically "fix" the elements in the container. The wings maintain a consistent pressure on the elements and the containers. This will help resist the tendency of the elements to become loose in the container due to vibration when the battery is used in an automobile, for example.

After this, standard battery construction techniques which are well known to those skilled in the art are employed to make the intercell connections, seal the cover to the case, weld positive and negative battery posts, and then fill the container with acid and place it in the formation process.

It will be appreciated that different numbers of battery elements, having differing sizes and shapes, can be containerized using this method.

EXAMPLE

A battery was constructed utilizing the abovedescribed method. This particular battery was an automotive SLI battery made in accordance with the invention and subjected to standard J-240 and cold-crank testing. The performance of these 12V batteries, which contained 10 plates per cell, approximately 0.83 pound of positive active material, 0.78 pound of negative active material, 1.66 pounds of 1.280 SG sulfuric acid, and 0.46 pound of lead-alloy grids, was as follows:

Reserve capacity: 96 Minutes
CCA: 500 Amperes
Cycle Life: 3,500 Cycles

The batteries were constructed in the following manner:

First, continuous grid stock was produced by the continuous casting of lead—1.1% antimony alloy containing 0.18% tin and 0.16% arsenic in the form of a single strip of grids using a specially designed rotary mold. This rotary mold is the main part of a continuous caster. The rotary mold is a cylindrical drum with a grid pattern cut around its circumference. The drum rotates to a point in contact with a casting shoe containing molten lead. This lead is packed into a grid pattern on the drum thereby creating a continuous grid strip. Casting was performed on a Wirtz continuous drum caster Model No. CC-1000 available from Wirtz Manufacturing, Port Huron, Michigan, operating at 120 feet per minute.

Upon exiting the caster, the strip was coiled "lug strip down" on a powered coiler having a vertical axis of rotation. The finished coil weighed approximately 2,000 pounds. The grid stock consisted of a 0.75 inches wide solid border of lead alloy on one edge which contained a pattern of cast-in protrusions and indentations. The grid stock had 3.35 wires per inch positioned parallel to each other and perpendicular to the border (vertical wires), diagonal wires which met the border at an angle of 28° and were spaced 0.298 inches apart, and a bottom border which ran parallel to the solid border and intersected the vertical and diagonal wires. The overall width of the grid stock was 4.47 inches. The stock tapered from 0.035 inches at the top of the solid strip to 0.025 inches at the intersection of the solid strip and the wires to 0.02 inches at the bottom border. The protrusions in the lug strip extended 0.055 inches from the surface of the strip so that, when the strip was coiled, the space between adjacent layers was about 0.055 inches. The coil was aged for 24 hours at room temperature before being pasted.

The grid strip was pasted on a standard Wirtz Manufacturing continuous strip paster in which standard SLI (starting, lighting, ignition) paste containing about 1% extra water was applied. The strip was uncoiled in the "lug-strip-down" position and rotated 90° so that it could be pasted horizontal. The strip was flush pasted on the bottom surface and overpasted 0.02 inches on the top surface. The strip moved through the paster at a speed of about 130 feet per minute. A layer of porous paper was applied to both surfaces of the strip to prevent sticking to the belt and to the rollers in the profiling step which followed.

Upon exiting the paster, the strip was passed through two pairs of steel rollers which moved some of the paste from the overpasted side of the plate strip to what was the flush pasted side of the strip, spread the paste to provide a uniform degree of overpasting on both sides of the strip, and profiled the surface of the strip. The first set of rolls consisted of one flat roll in contact with the overpasted surface of the strip and a roll containing grooves which was in contact with the opposite side of the strip. The flat roll forced paste to flow through the plate to the opposite side where it moved into the grooves on the opposite roll and provided a "lump" of paste which would subsequently be distributed by the second set of rollers. The first set of rollers were 2.25 inches in diameter and 3.9 inches long. The grooves in the second roller were 0.085 inches wide and 0.030 inches deep and were oriented at an angle of 28° to the axis of the roller. The second set of rollers had a series of diagonal grooves 0.0165 inches deep, 0.023 inches wide at the base, and 0.042 inches wide at the roller surface, (i.e., had flattened hills and valleys) which were at an angle of 28° from the vertical. Both sets of rolls engaged the protrusions on the lug strip of the pasted strip and were powered by their interaction with these protrusions when the strip was pulled through the assembly by a powered coiler. The redistribution of paste and the profiling increased the overall thickness of the pasted portion of the plate stock to 0.07 inches.

Upon existing the profiler, the strip was coiled "lug strip down" on a flat spool made from expanded steel sheet which allowed air to circulate through the coil. Since the paste thickness had increased to 0.07 inches, the space between wraps of the pasted strip due to the lug strip protrusions was reduced to 0.01 inches. The coil of pasted plate stock measured 4 feet in diameter.

Almost immediately after coiling, the coil of pasted plate stock was moved to an individual curing chamber. The 1% extra moisture added to the paste prevented the oxidation reaction from starting prior to the time when it could be controlled in the curing chamber. The temperature of the chamber was increased to about 220° F., at which level it was maintained for 6 hours. The temperature of the coil gradually increased and reached 195° within 3 hours and leveled off at 200° F., where it stayed for the next 3 hours. During the next 6 hours, air in the chamber was replaced with outside air to facilitate drying. This exchange was made once per minute by operating an exhaust fan for ten seconds of each minute. By this means, the temperature in the chamber was maintained above 150° F. while the temperature of the coil dropped to 170° F. Oxidation of the free lead in the paste started after about 3 hours of drying and lasted for about another 3 hours during which time the temperature of the coil increased by about 5° F. After the 6 hour drying cycle, the chamber and the coil were returned to room temperature and the coil was removed from the chamber and allowed to dry further outside of the chamber for another 24 hours. Laboratory tests confirmed a free lead content of only 0.01% and an 85% conversion to tetra-basic lead sulfate.

The dried plate strip was cut into individual plates for assembly into elements, and one lug per plate was punched into the lug strip. The individual plates measured 3.9 inches in height and 5.75 inches in weight. Each positive plate weighed 0.21 pound and each negative plate weighed 0.20 pound.

The plates were next assembled into elements which contained a total of 5 positive plates and 5 negative plates, each separated by a single sheet of flat (non-ribbed) separator stock manufactured by W. R. Grace, Cambridge, Massachusetts under the tradename "Daramic". Each element contained one positive plate between separators and one negative plate between separators. The separators overlapped the plates by 0.25 inches at the top, 0.18 inches at the bottom, and 0.18 inches on each edge.

The element was "unitized" by folding the separators tightly around the edges and bottom of the plates, overlapping each with the separator on the opposite side of the plate, and joining the separators together with acid resistant, pressure sensitive tape.

Standard battery construction techniques were then employed in forming the plate straps, posts, and intercell connectors to place the elements into the container, and to seal the cover to the battery container.

As can be seen from these test results, the performance of batteries made in accordance with the features of this invention compared very favorably with that of conventional batteries, even though these new batteries contained considerably less active material and grid metal and are much less expensive to produce.

It will be appreciated that the invention disclosed herein provides a method and associated apparatus and battery design for producing a lead-acid battery having improved operating characteristics. The first aspect of the invention is the method of producing a battery grid strip having protrusions on a lug strip, and a reticulated grid portion. The second aspect of the invention involves providing an overpasted battery plate having profile grooves and a method of overpasting and profiling the paste which is applied to the battery grid strip. Curing of the battery plate is accomplished by a curing chamber and associated method. The fourth aspect of the invention involves elementizing the positive and negative battery plates, separator stock, and winged end plate to form a battery element. The fifth aspect of the invention involves containerization of the desired number of battery elements. While for convenience, focus has been on the individual aspects of the invention, it will be apparent to those skilled in the art that one may employ all or a combination of one or more of the various aspects in a battery production system, as desired.

Whereas particular alloys and compositions have been disclosed, it would be obvious to one skilled in the art that other alloys and compositions may be substituted therefore.

As used herein, the terms "top", "bottom", "right" and "left" are used for convenience of disclosure only and shall not be deemed a limitation on the disclosure, except unless specifically stated so in a particular context.

Whereas a particular embodiment of the invention has been described above, for purposes of illustration, it will be evident to those skilled in the art that numerous variations of the details may be made without departing from the invention as defined in the appended claims.

We claim:

1. A battery plate strip for making battery plates for use in lead-acid batteries having a battery grid strip including a reticulated grid strip portion, a lug strip portion adjacent to said reticulated grid strip portion on one edge of said reticulated grid strip portion and a border strip portion adjacent to said reticulated grid strip portion on an opposite edge of said reticulated grid strip portion from said lug strip portion and a battery paste layer disposed on said reticulated grid strip portion, the improvement comprising said battery paste layer having a profiled surface having at least one groove which is disposed at an angle of greater than about 45° and less than 90° relative to said border strip portion on either side of a plane perpendicular to said border strip portion and said profiled surface having a region of reduced width which is oriented generally parallel to said border strip portion and which meets at least some of said grooves.

2. The battery plate strip of claim 1, including
said reticulated grid strip portion having a first and second side and
said battery paste layer extending laterally beyond both said sides of said reticulated grid strip portion.

3. The battery plate strip of claim 2, including
said grooves having two generally angularly and outwardly disposed sides, defining a generally V-shaped groove.

4. The battery plate strip of claim 2, including
said grooves having two generally angularly and outwardly disposed sides and a base wall defining a generally U-shaped groove.

5. The battery plate strip of claim 3, including
said sides having a length of about 0.015 to 0.025 inches.

6. The battery plate strip of claim 4, including
said sides having a length of about 0.015 to 0.025 inches and a base having a length of about 0.01 to 0.02 inches.

7. The battery plate strip of claim 2, including
said angle being about 50° to 75°.

8. The battery plate strip of claim 2, including
said grooves being generally parallel to said other grooves.

9. The battery plate strip of claim 8, including
said grooves being disposed about 0.01 to 0.03 inches apart from the next adjacent said grooves.

10. A coil of pasted battery plate stock having a plurality of wraps of pasted battery plate strip comprising a battery grid strip including a reticulated grid strip portion, a lug strip portion on one side of said reticulated grid strip portion and a border strip portion adjacent to said reticulated grid strip portion on an opposite side of said reticulated grid strip portion from said lug strip portion and a battery paste layer disposed on said reticulated grid strip portion, the improvement comprising a space being maintained between adjacent wraps of said pasted battery plate stock.

11. The coil of claim 10, including
said lug strip portion having one or more protrusions.

12. The coil of claim 10, including
said coil having spacer means interposed between at least a major number of adjacent pairs of said wraps of pasted battery plate stock.

13. The coil of claim 12, including
said spacer means adjacent to said lug strip portion.

* * * * *

UNITED STATES PATENT AND TRADEMARK OFFICE
CERTIFICATE OF CORRECTION

PATENT NO. : 5,079,111

DATED : January 7, 1992

INVENTOR(S) : ELLIS G. WHEADON and LARRY L. FORRER

It is certified that error appears in the above-identified patent and that said Letters Patent is hereby corrected as shown below:

Column 3, line 42, "earilier" should be --earlier--.

Column 9, line 21, "in" should be --for--.

Column 21, line 32, "108" should be --36--.

Column 27, line 4, "existing" should --exiting--.

Signed and Sealed this

Thirtieth Day of August, 1994

Attest:

BRUCE LEHMAN

Attesting Officer     Commissioner of Patents and Trademarks